United States Patent
Gokturk et al.

(10) Patent No.: US 7,526,120 B2
(45) Date of Patent: Apr. 28, 2009

(54) SYSTEM AND METHOD FOR PROVIDING INTELLIGENT AIRBAG DEPLOYMENT

(75) Inventors: Salih Burak Gokturk, Mountain View, CA (US); Cyrus Bamji, Fremont, CA (US); Abbas Rafii, Palo Alto, CA (US); Carlo Tomasi, Palo Alto, CA (US); Xinqiao Liu, San Jose, CA (US)

(73) Assignee: Canesta, Inc., Sunnyvale, CA (US)

( * ) Notice: Subject to any disclaimer, the term of this patent is extended or adjusted under 35 U.S.C. 154(b) by 399 days.

(21) Appl. No.: 10/660,907

(22) Filed: Sep. 11, 2003

(65) Prior Publication Data

US 2004/0153229 A1 Aug. 5, 2004

Related U.S. Application Data

(60) Provisional application No. 60/410,224, filed on Sep. 11, 2002.

(51) Int. Cl.
G06K 9/00 (2006.01)
(52) U.S. Cl. ........................ 382/154; 382/106
(58) Field of Classification Search ................ 382/154, 382/106
See application file for complete search history.

(56) References Cited

U.S. PATENT DOCUMENTS

| | | | |
|---|---|---|---|
| 3,610,754 A | 10/1971 | Pirlet | |
| 3,857,022 A | 12/1974 | Rebane et al. | |
| 4,187,492 A | 2/1980 | Delignieres | |
| 4,294,544 A | 10/1981 | Altschuler et al. | |
| 4,312,053 A | 1/1982 | Lipsky | |
| 4,333,170 A | 6/1982 | Mathews et al. | |
| 4,376,301 A | 3/1983 | Roberts | |
| 4,541,722 A | 9/1985 | Jenks | |

(Continued)

FOREIGN PATENT DOCUMENTS

EP 0370770 A1 5/1990

(Continued)

OTHER PUBLICATIONS

Naoshi Matsuo et al., "Speaker Position Detection System Using Audio-visual Information," Dec. 1999, XP 000931599, pp. 214-220.

(Continued)

*Primary Examiner*—Matthew C. Bella
*Assistant Examiner*—John B Strege
(74) *Attorney, Agent, or Firm*—Canesta, Inc.; Michael A. Kaufman, Esq.

(57) ABSTRACT

A sensor system is provided for determining a deployment level of an airbag in a vehicle. A light source of the sensor system emits light onto a region around a vehicle seat. An array of light-sensitive pixels which capture reflected light from the scene, including reflected light that originated from the light source. Processing resources are provided that determine depth information for an object in the scene based on a time-of-flight characteristic of the reflected light from the light source captured on the array. The processing resources may be configured to determine occupancy data for the object based on the captured reflected light from the scene. The processing resources are configured to determine the deployment level of the airbag based at least in part on the occupancy data in when a collision of the vehicle occurs.

31 Claims, 11 Drawing Sheets

U.S. PATENT DOCUMENTS

| | | | |
|---|---|---|---|
| 4,625,329 A | 11/1986 | Ishikawa et al. | |
| 4,683,373 A | 7/1987 | Tupman | |
| 4,686,655 A | 8/1987 | Hyatt | |
| 4,688,933 A | 8/1987 | Lapeyre | |
| 4,716,542 A | 12/1987 | Peltz et al. | |
| 4,804,859 A | 2/1989 | Swart | |
| 4,956,824 A | 9/1990 | Sindeband et al. | |
| 4,980,870 A | 12/1990 | Spivey et al. | |
| 4,986,662 A | 1/1991 | Bures | |
| 4,995,639 A | 2/1991 | Breed | |
| 5,003,166 A | 3/1991 | Girod | |
| 5,028,750 A | 7/1991 | Spies et al. | |
| 5,056,791 A | 10/1991 | Poillon et al. | |
| 5,099,456 A | 3/1992 | Wells | |
| 5,102,223 A | 4/1992 | Uesugi et al. | |
| 5,161,821 A | 11/1992 | Curtis | |
| 5,166,905 A | 11/1992 | Currie | |
| 5,174,759 A | 12/1992 | Preston et al. | |
| 5,381,235 A | 1/1995 | Inoue et al. | |
| 5,389,751 A | 2/1995 | Breed | |
| 5,442,573 A | 8/1995 | Bredberg et al. | |
| 5,482,314 A | 1/1996 | Corrado et al. | |
| 5,573,077 A | 11/1996 | Knowles | |
| 5,585,625 A | 12/1996 | Spies | |
| 5,602,734 A | 2/1997 | Kithil | |
| 5,612,876 A | 3/1997 | Zeidler et al. | |
| 5,617,371 A | 4/1997 | Williams | |
| 5,626,359 A | 5/1997 | Steffens, Jr. et al. | |
| 5,653,462 A | 8/1997 | Breed et al. | |
| 5,733,031 A | 3/1998 | Lin | |
| 5,737,083 A | 4/1998 | Owechko et al. | |
| 5,739,757 A | 4/1998 | Gioutsos | |
| 5,785,347 A * | 7/1998 | Adolph et al. | 280/735 |
| 5,802,208 A | 9/1998 | Podilchuk et al. | |
| 5,825,033 A | 10/1998 | Barrett et al. | |
| 5,835,613 A | 11/1998 | Breed et al. | |
| 5,835,616 A | 11/1998 | Lobo et al. | |
| 5,842,194 A | 11/1998 | Arbuckle | |
| 5,845,000 A | 12/1998 | Breed et al. | |
| 5,848,802 A | 12/1998 | Breed et al. | |
| 5,893,582 A | 4/1999 | Allen et al. | |
| 5,927,752 A | 7/1999 | Brandin | |
| 5,969,822 A | 10/1999 | Fright et al. | |
| 5,983,147 A | 11/1999 | Krumm | |
| 5,997,033 A | 12/1999 | Gray et al. | |
| 6,002,435 A | 12/1999 | Yamamoto et al. | |
| 6,005,958 A | 12/1999 | Farmer et al. | |
| 6,075,605 A | 6/2000 | Futamura et al. | |
| 6,108,437 A | 8/2000 | Lin | |
| 6,111,517 A | 8/2000 | Atick et al. | |
| 6,116,638 A * | 9/2000 | Hosoda | 280/735 |
| 6,137,896 A | 10/2000 | Chang et al. | |
| 6,168,198 B1 | 1/2001 | Breed et al. | |
| 6,186,537 B1 | 2/2001 | Breed et al. | |
| 6,188,777 B1 | 2/2001 | Darrell et al. | |
| 6,198,998 B1 | 3/2001 | Farmer et al. | |
| 6,220,627 B1 | 4/2001 | Stanley | |
| 6,223,714 B1 | 5/2001 | Anderson et al. | |
| 6,254,127 B1 | 7/2001 | Breed et al. | |
| 6,266,048 B1 | 7/2001 | Carau, Sr. | |
| 6,281,878 B1 | 8/2001 | Montellese | |
| 6,290,255 B1 | 9/2001 | Stanley et al. | |
| 6,302,438 B1 * | 10/2001 | Stopper et al. | 280/735 |
| 6,325,414 B2 | 12/2001 | Breed et al. | |
| 6,327,221 B1 | 12/2001 | Gualtieri | |
| 6,371,513 B1 | 4/2002 | Fujimoto et al. | |
| 6,378,899 B1 | 4/2002 | Fujimoto | |
| 6,393,133 B1 | 5/2002 | Breed et al. | |
| RE37,736 E | 6/2002 | Breed et al. | |
| 6,412,813 B1 | 7/2002 | Breed et al. | |
| 6,421,042 B1 | 7/2002 | Omura et al. | |
| 6,422,595 B1 | 7/2002 | Breed et al. | |
| 6,422,598 B1 * | 7/2002 | Yasui | 208/735 |
| 6,441,363 B1 | 8/2002 | Cook, Jr. et al. | |
| 6,450,556 B1 | 9/2002 | Jacobs | |
| 6,463,163 B1 | 10/2002 | Kresch | |
| 6,480,616 B1 | 11/2002 | Hata et al. | |
| 6,614,422 B1 | 9/2003 | Rafii et al. | |
| 6,650,318 B1 | 11/2003 | Arnon | |
| 6,690,357 B1 | 2/2004 | Dunton et al. | |
| 6,710,770 B2 | 3/2004 | Tomasi et al. | |
| 6,734,879 B2 | 5/2004 | Hasha et al. | |
| 6,791,700 B2 | 9/2004 | Omura et al. | |
| 6,801,662 B1 | 10/2004 | Owechko et al. | |
| 6,961,443 B2 * | 11/2005 | Mahbub | 382/100 |
| 2001/0003168 A1 * | 6/2001 | Breed et al. | 701/45 |
| 2001/0015548 A1 | 8/2001 | Breed et al. | |
| 2001/0020777 A1 | 9/2001 | Johnson et al. | |
| 2001/0042976 A1 | 11/2001 | Breed et al. | |
| 2001/0043719 A1 | 11/2001 | Haakawa et al. | |
| 2002/0024676 A1 | 2/2002 | Fukuzaki | |
| 2002/0089157 A1 | 7/2002 | Breed et al. | |
| 2002/0125050 A1 | 9/2002 | Breed et al. | |
| 2002/0140214 A1 | 10/2002 | Breed et al. | |
| 2002/0140949 A1 | 10/2002 | Sasaki et al. | |
| 2003/0048930 A1 | 3/2003 | Mihara et al. | |
| 2004/0153229 A1 | 8/2004 | Gokturk et al. | |

FOREIGN PATENT DOCUMENTS

| | | |
|---|---|---|
| EP | 0420500 A2 | 4/1991 |
| EP | 0626636 A2 | 11/1994 |
| EP | 0982676 A1 | 3/2000 |
| EP | 1039365 A2 | 9/2000 |
| EP | 1045586 A2 | 10/2000 |
| WO | WO 84/00427 A1 | 2/1984 |
| WO | WO 97/01458 A1 | 1/1997 |
| WO | WO 98/17508 A1 | 4/1998 |
| WO | WO 98/48372 A1 | 10/1998 |
| WO | WO 98/52797 A1 | 11/1998 |
| WO | WO 00/19705 A1 | 4/2000 |
| WO | WO 00/38958 A1 | 7/2000 |
| WO | WO 00/50268 A1 | 8/2000 |
| WO | WO 01/12473 A1 | 2/2001 |
| WO | WO 01/60662 A1 | 8/2001 |
| WO | WO 01/85497 A1 | 11/2001 |
| WO | WO 01/94157 A1 | 12/2001 |
| WO | WO 01/96147 A3 | 12/2001 |
| WO | WO 02/21502 A1 | 3/2002 |
| WO | WO 02/31455 A1 | 4/2002 |
| WO | WO 02/33922 A2 | 4/2002 |

OTHER PUBLICATIONS

Ren C. Luo et al., "Defocusing Blur Restoration in Natural Scene Images for Factual Analysis," Nov. 15, 1993, IEEE, pp. 1377-1381.

"Sonar," encyclopedia article from Wikipedia (electronic publication, no date).

Breed, David S., "A Smart Airbag System," Automotive Technologies International, Inc., 1998.

* cited by examiner $\phi = 2d/C$

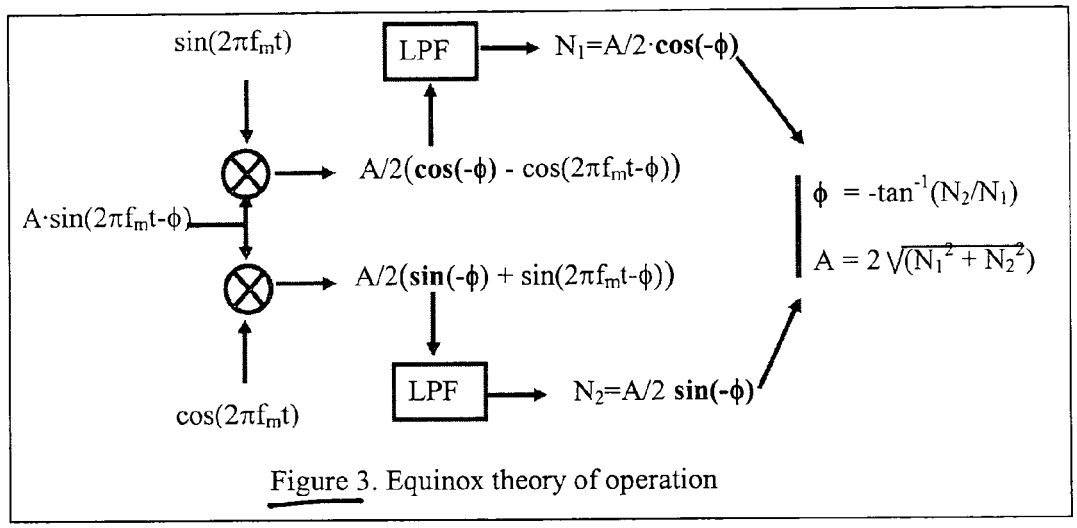
Figure 3. Equinox theory of operation
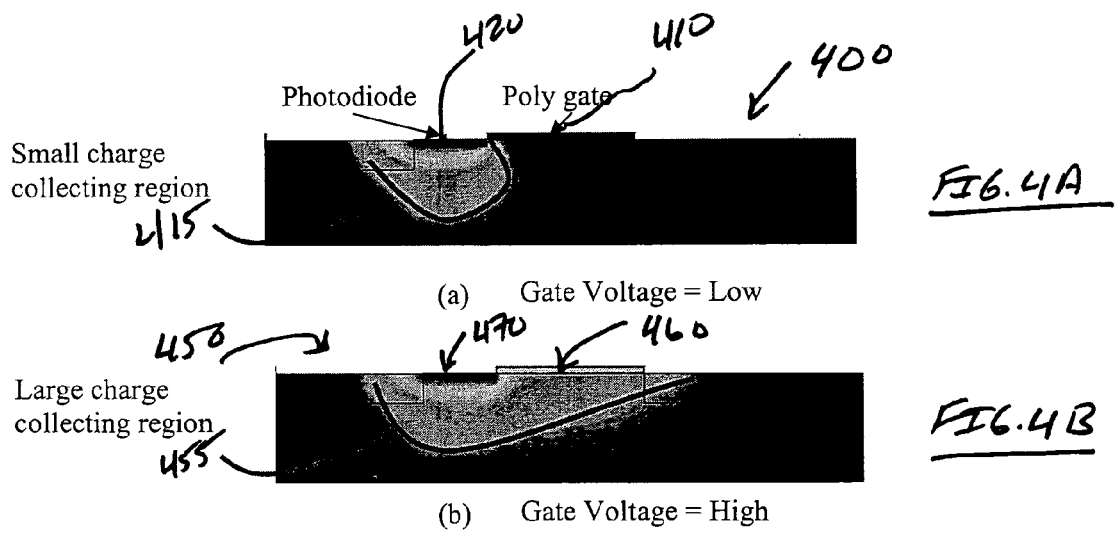
Figure 4. Photodiode quantum efficiency modulation structure where charge collection area is modulated as a function of gate voltage

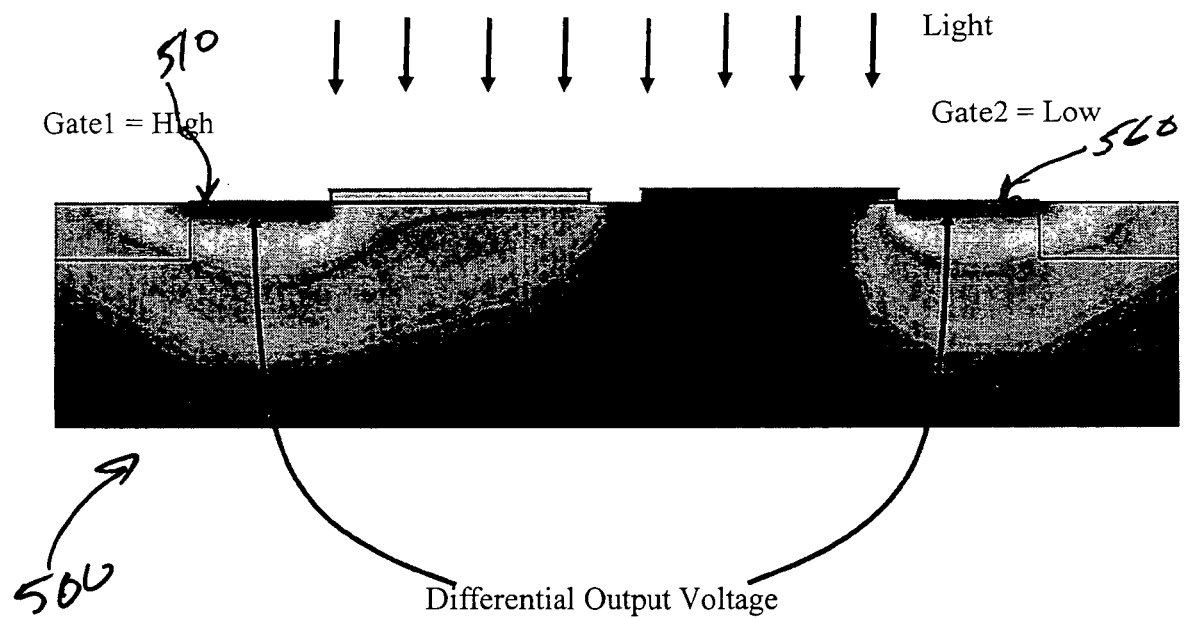
Figure 5. Differential QE modulation pixel structure.
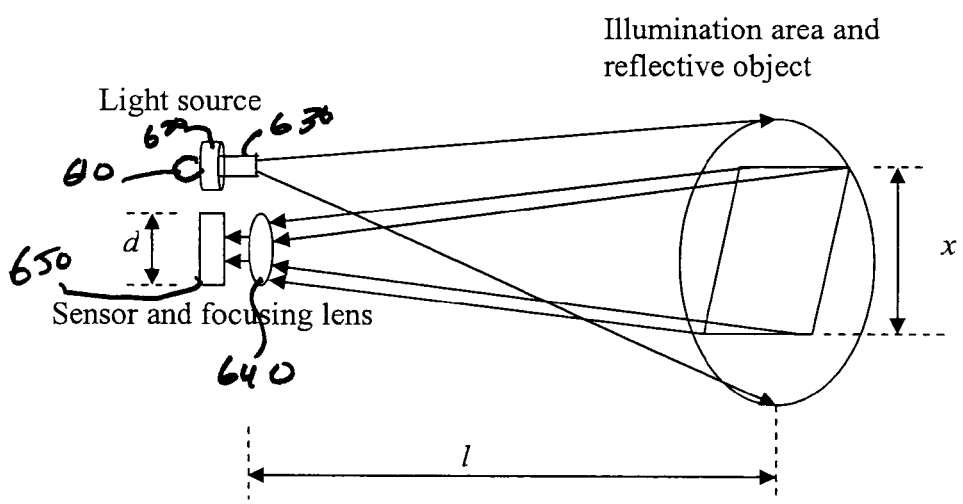
Figure 6. Optical system

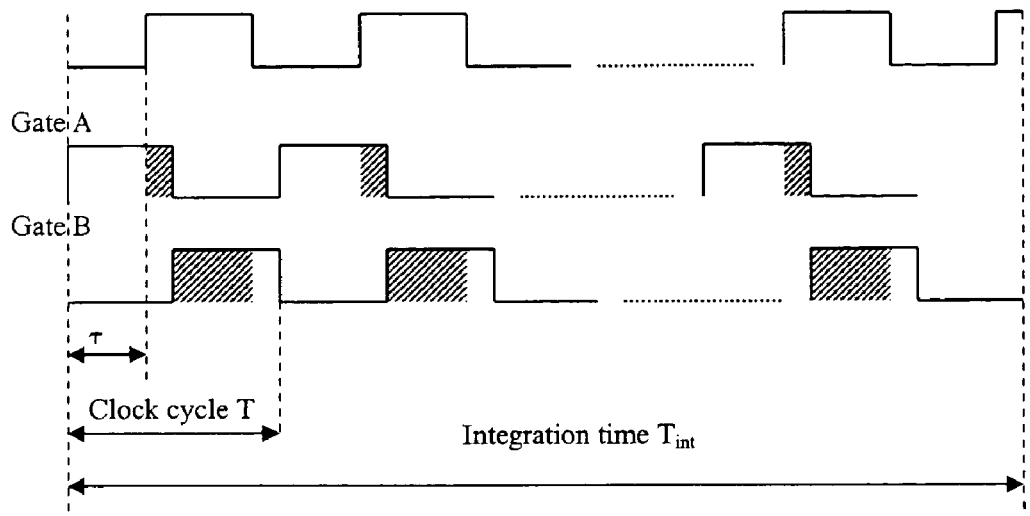
Figure 7. Charge collection model with differential QE modulated photodiodes; shaded area represents the active charge collection.
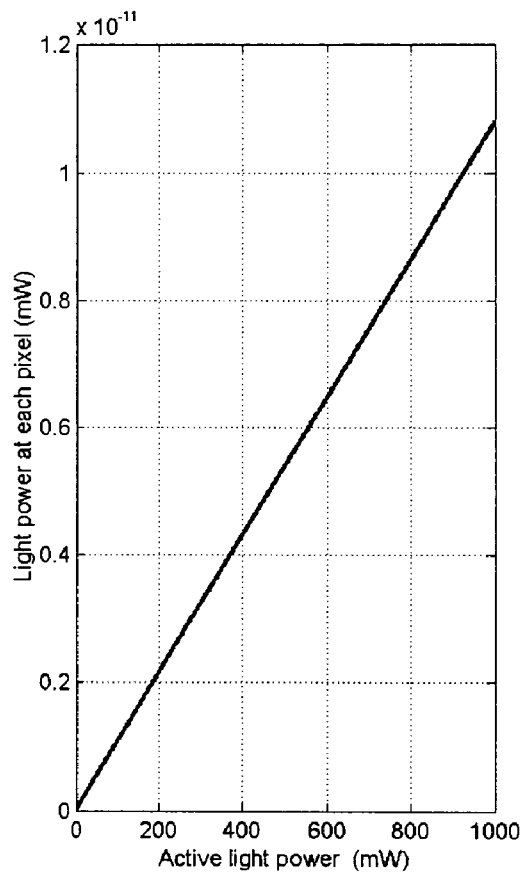
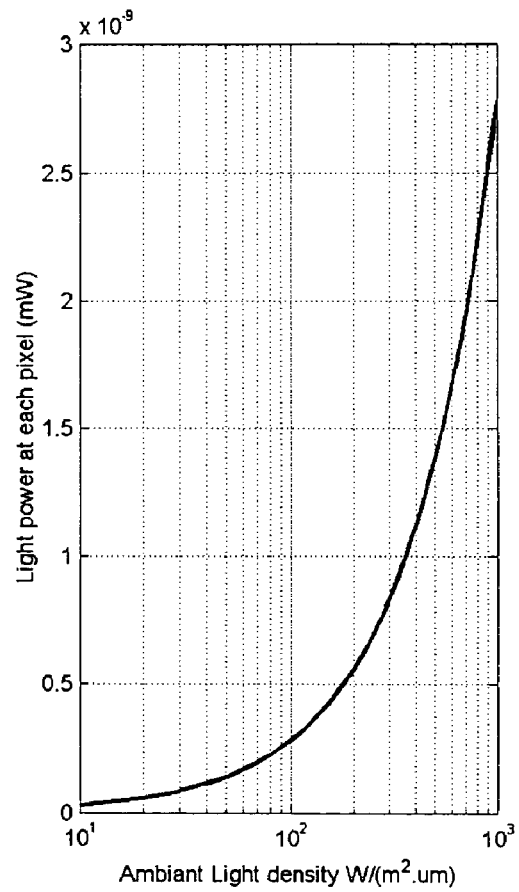
FIG. 8A          FIG. 8B

SYSTEM AND METHOD FOR PROVIDING INTELLIGENT AIRBAG DEPLOYMENT

RELATED APPLICATIONS

This application claims priority to U.S. Provisional Patent Application No. 60/410,224, "3D Imaging System For Intelligent Airbags" by Xinqiao Liu, S. Burak Gokturk, Cyrus Bamji, Abbas Rafii, filed on Sep. 11, 2002. The aforementioned application is hereby incorporated by reference for all purposes.

TECHNICAL FIELD

This application relates generally to airbags and other safety restraints for vehicles. More specifically, this application relates to intelligent deployment and use of such airbags and safety restraints for vehicles.

BACKGROUND

Airbag systems have been used for several years as one of the primary safety mechanisms in vehicles. While airbags are installed in vehicles for purpose of passenger safety, the deployment of airbags in itself has over the years raised safety concerns. In the past, an airbag that suddenly deploys can be fatal to small children, and injure adults who are too close the point of deployment. Several approaches have been attempted in order to control airbag deployment and avoid safety issues. Many past approaches focus on reducing the speed and amount of inflation for an airbag when a small passenger is in the target car seat, when the passenger is either too close to the airbag, or when the passenger is in a nonstandard position.

PCT/DE01/00500 describes a classification system where a video camera measures the head height of the front passenger-seat occupant. A pressure sensor on the floor detects the presence of feet. Feet & small head height lead to 5th percentile female (1.50 m height, 50 kg weight), while no feet & small head height lead to 5-8 year-old child classification.

In U.S. Pat. No. 5,983,147, a video camera is used to determine if the front right seat is empty, occupied by a Rear-Facing Infant Seat (RFIS), or occupied by a person. A range camera is used to estimate the weight of the occupant. The image processing involved the following steps: (1) histogram equalization to reduce variations caused by lighting changes, and (2) comparison of an image over a seat to a library of stored images that are applicable to a given situation (18 components used in an example). Comparison is done by correlation. A sample covariance matrix is used to weigh correlations. Occupant distance from the dashboard is measured by converting disparity maps from a stereo camera to depth maps. The occupant is found by comparing an empty-seat image to the actual image. Landmark points on the dashboard are also seen in the image, and landmark-to-occupant distances are measured. When some function of these distances is too small, airbag deployment is inhibited.

PCT/SE98/00867 describes a system that has a light ray emitted from a rotating gimbal at a reference point. The driver sits in the car, then rotates the gimbal until s/he sees the light. A mechanical encoder measures the orientation of the gimbal, and an infrared or ultrasound distance sensor measures the distance between gimbal and the driver's eyes. This gives eye coordinates in three-dimensions, and an 'anthropometric model' uses these to look up 'passenger parameters.' A variation of this scheme is to use math to infer the position of the driver's eyes from the orientation of the rearview mirror, and an infrared or ultrasound sensor.

In PCT/US98/07685 another occupant type and position detection system is described. A single camera mounted on either A-pillar sees both the driver- and passenger-side seats. The scene is lit by infrared (IR) light-emitting diode (LED). The image is rectified with a correction lens to make the image look as if it were taken from the side of the vehicle. Depth is determined by defocus. An occupancy grid is generated, and compared to "stored profiles" of images that would be obtained with an empty seat, a RFIS, a person. To allow for shape and size variations, a "size-invariant classification of reference features" must be used. Size-invariant classification is in general a very difficult task, and this application does not disclose how features are compared to stored profiles.

In U.S. Pat. No. 6,422,595 and U.S. Pat. No. 6,325,414, a system is described where seat occupant's position and velocity are obtained through use of various types of sensors. One IR transmitter and two IR receivers are located on the instrument panel. The transmitter rays reflect from windshield and reflect from the occupant to be received at the two receivers to estimate the occupant's position.

U.S. Pat. No. 6,412,813 describes a method and system for detecting a child seat. Three ultrasonic transducers are used for presence detection. One transducer is used for transmission while the other two are used for reception. Variation between the two receptions is used to determine the type of the occupant as well as the mounting position of a child seat if it is occupying the seat.

U.S. Pat. No. 6,302,438 describes an occupant detection system for controlling the activation of an air bag inflator that incorporates a transmitter/receiver subsystem and a ranging subsystem that respectively measure the distances from a point of reference to the upper seat back and to the region in front of the upper seat back. If a normally seated occupant is detected from the difference of the respective distances, then the air bag inflator is enabled.

PCT/US01/19206 describes a system where an occupant sensor incorporates a three dimensional imaging system that acquires a three dimensional image of an object. The image is segmented to remove unwanted portions and to identify a region-of-interest, and the content thereof is classified responsive to a plurality of three-dimensional features. A stereo system, a light system and a laser range sensor has been provided as the three-dimensional sensor.

Various non-imaging based systems were also proposed in various patents. PCT/US00/22033 describes a weight-sensor array based system. U.S. Pat. No. 6,327,221 proposes an ultrasound based solution. PCT/US99/31310 proposes an electric field sensor. PCT/US96/10645 proposes a reflective capacitive proximity sensor. PCT/US97/18418 describes a system with multiple sensors including a weight sensor, a child seat sensor, a crash sensor and a seat belt sensor.

BRIEF DESCRIPTION OF THE DRAWINGS

FIG. 3 is a graphical depiction of how a sensor system described with FIG. 2 may operate.

FIGS. 4A and 4B each illustrate a variable sensitivity diode structure that can be used for purpose of modulating the sensitivity of the photodiode.

FIG. 5 illustrates a differential pixel structure formed by combining structures of FIGS. 4A and 4B, under an embodiment of the invention.

FIG. 6 illustrates an optical sensor system for obtaining depth and brightness image data, under one embodiment of the invention.

FIG. 7 is a diagram that illustrates that during integration, charge is integrated on the differential photodiode A and B within each pixel.

FIG. 8A plots the optical power for each pixel due to active illumination on a 0.64 m$^2$ area (0.8 m*0.8 m).

FIG. 8B plots the optical light for each pixel due to ambient sunlight on the same area.

Figure 1:
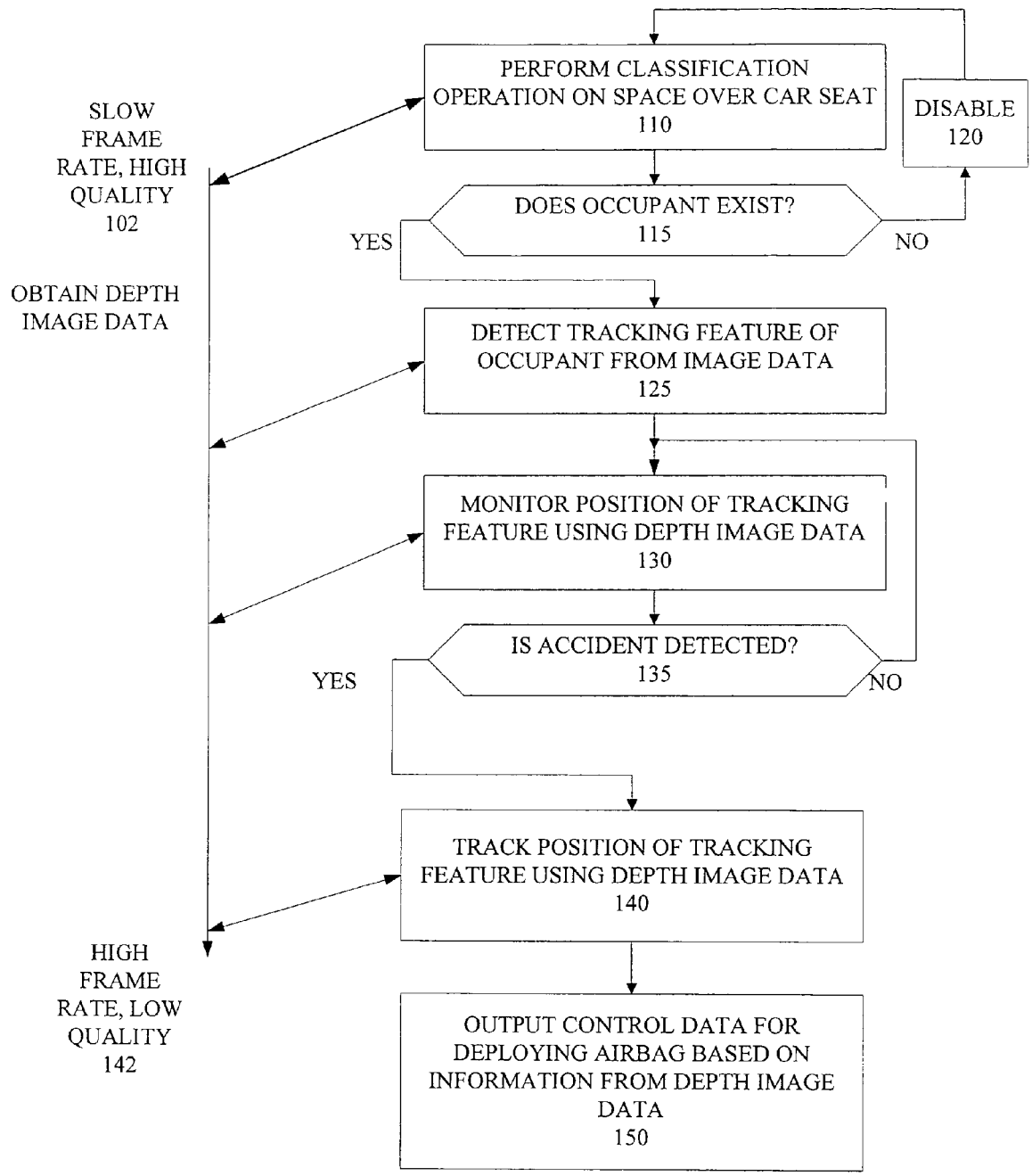
FIG. 1 shows a method for the intelligent deployment of an airbag based on occupancy information provided by a depth-perceptive sensor system, under an embodiment of the invention.

In the drawings, the same reference numbers identify identical or substantially similar elements or acts. To easily identify the discussion of any particular element or act, the most significant digit or digits in a reference number refer to the Figure number in which that element is first introduced. Any modifications necessary to the Figures can be readily made by one skilled in the relevant art based on the detailed description provided herein.

DETAILED DESCRIPTION 1.0 Overview

Recent studies have shown that safe operation of an airbag deployment system depends in part on the occupant type and location during the deployment. Thus, the determination of occupant type (child, adult, etc.), and occupant location may affect the safety and effectiveness of an airbag deployment system. Embodiments of the invention use occupancy data, including data for determining occupant classification and position, to make decisions on when an airbag is deployed, as well as the power level in which the airbag is deployed. Furthermore, embodiments described herein determine the occupant data under various environmental conditions, such as sunlight and other illuminations, or lack of illumination as the case might be, and temperature. The occupant data can be determined for carious types of people and situations as well, including for example, when people hold objects in a car seat, or when a pet is present on the car seat.

Embodiments of the invention provide data for use in determining when an airbag should be deployed based on occupancy of a target vehicle seat. In addition, embodiments of the invention provide data for use in determining when an airbag should be deployed with less power. By providing data for enabling such decisions to be made, embodiments of the invention enable the operation of an intelligent and safe airbag system. Specific situations in the past where airbag deployment would contributed to injury or death are avoided. Such situations include when small people or children are the occupants of the vehicle seat, or when the occupant is postured (e.g. leaning forward against the dash) in a manner where the airbag deployment would cause injury.

According to one embodiment, a sensor system is provided for controlling the deployment of an airbag, where the sensor system includes a depth-perceptive imaging sensor and reasoning software (or equivalent encoding, programming or logic). The imaging sensor may be capable of producing the following types of data: (i) a depth map, (ii) a reflectivity based intensity image, and (iii) a regular intensity image. The sensor may obtain such data by measuring the flight time and/or phase delay shift for light emitted from a source and reflected off of a target. The robust operation of the sensor under varying illumination conditions is ensured by several means as described in the text below.

In one embodiment, reasoning software uses a combination of algorithms, which are performed using the various data types generated by the sensor system. The reasoning software is processes the data collected from the sensor system and outputs data for making correct (or at least the most correct) decisions on the operation or deployment of the airbag. By accumulating increasingly better knowledge of occupant type, the reasoning software can in turn apply effective methods to selected segments of the image to improve the depth measurements of the sensor. This may include using appropriate temporal and spatial averaging techniques.

The reliability of an airbag deployment system may be based on factors that include the following: (i) confidence built by high level reasoning over time; (ii) a depth-perceptive sensor that accumulates three major types of data for analysis—(a) a depth image, (b) an active illumination image and (c) an ambient illumination image; and (iii) the ability to configure airbag deployment in a few milliseconds after a crash. Algorithms cognizant of the different types of data are executed on each of the images obtained by the depth-perceptive sensor. This aggregate data may improve the confidence level of the classification process beyond that of a system using only one of the kinds of data. Additional description of the depth-perceptive sensor and the reasoning software/system are provided below.

According to one embodiment, a sensor system is provided for determining a deployment level of an airbag in a vehicle. The sensor system includes a light source that emits light onto a scene, where the scene includes a vehicle seat for the airbag. The sensor system may also include an array of light-sensitive pixels which capture reflected light from the scene, including reflected light that originated from the light source. Processing resources are provided that determine depth information for an object in the scene based on a time-of-flight characteristic of the reflected light captured on the array. The processing resources may be configured to determine occupancy data for the object based on the captured reflected light from the scene. The processing resources are configured to determine the deployment level of the airbag based at least in part on the occupancy data in when a collision of the vehicle occurs.

According to another embodiment, a deployment level of an airbag in a vehicle may be determined by repeatedly capturing depth images of a scene that includes a region of a vehicle seat. Occupancy information is repeatedly from the captured depth images. When an event that triggers deployment of the airbag occurs, the frequency at which depth images are captured and occupancy information is obtained is increased. The deployment level of the airbag based at least in part on the occupancy information determined after occurrence of the event.

2.0 Detailed Overview

FIG. 1 shows a method for the intelligent deployment of an airbag based on occupancy information provided by a depth-perceptive sensor system. The context of a method such as described in FIG. 1 is a car seat, such as the front passenger seat. In FIG. 1, the occupancy information is assumed to be occupant classification and a monitored or tracked position of the occupant.

Step 105 is repeatedly performed. In step 105, a depth map and brightness image ("depth image data") is obtained for a region just around the car seat (where the airbag is to be deployed). The frequency at which this step is performed depends on what operation or function the depth image data is to be used for. As will be described, one embodiment provides for two, three or more events that, when occurred, increase the frequency by which step 105 is performed. A sub-step 102 provides that depth image data is obtained at a slow frame rate, with relatively high resolution. A sub-step 122 provides that the depth image data is obtained at an intermediate frame rate, with intermediate resolution. A sub-step 142 provides that the depth image data is obtained at a high frame rate and relatively low resolution. It should be recognized that the relative resolution quality is a design choice, and that the resolution may in fact be uniform. For example, depth image data may be captured at one intermediate resolution, depending on the equipment being used. As will be described, one or more events that trigger variations to the frame rate and resolution may coincide with other steps of determination of events that lead to performance of one or more steps in a method of FIG. 1.

The depth image data may be obtained using a depth-perceptive sensor system such as described below. Such a system may use a camera, or other image capturing device. Depth image data may be captured as an image on one or more arrays of pixels. In one embodiment, the speed or frequency in which the depth image data is obtained may be controlled by a shutter speed of a camera of a sensor system.

In step 110, a classification operation is performed on a space around the target car seat. In one embodiment, the classification operation is performed in order to classify the occupant in one or more classifications that include the following: (i) empty or not empty, and (ii) adult, child, and/or non-human. This step may also be performed repeatedly, either over distinct intervals or in response to specific events. Specific events may include, for example, detecting a new occupant in the target seat, or receiving data indicating an accident has just occurred. .

In step 115, the determination is made as to whether the occupant is of a type where deployment of the airbag is warranted or safe if there is an accident with the vehicle. If there is no object over the target car seat, and/or the object is of a type where airbag deployment is not warranted or safe, then step 120 provides that deployment of the airbag is disabled. Following step 120, step 110 may be repeated, such as at a designated time in the future or after a specific event where a new occupant may be expected. For example, step 110 may be repeated periodically on depth image data obtained in sub-step 102. Alternatively, for example, step 110 may be performed immediately after the car engine being started, and/or the car seat being moved, and/or the door for that car seat being opened and then shut.

If the determination in step 115 is that there is an occupant, step 125 provides that a tracking feature of the occupant is detected. In one embodiment, the tracking feature is based on the occupant classification. For example, if a result of step 110 is that the occupant is an adult, then the tracking feature that may be detected is the occupant's head, or some other body part such as the forehead, eye, or torso. If the result of step 110 is that the occupant is a child, the same tracking feature or a different tracking feature may be detected. Step 125 may use depth image data obtained in sub-step 122 of step 105. In one embodiment, once detection of the tracking feature is detected, the rate at which depth images are obtained increased over the rate at which depth images were obtained for occupant classification. Likewise, the resolution of the depth image data decreases as a result of the increased frequency in which depth image data is obtained.

Step 130 provides that the position of the tracking feature is monitored. This step also uses the depth image data of step 105, where depth image data is captured at a sufficient rate and resolution to enable detection of the tracking feature with movement of the occupant over the car seat. Further description of how steps 125 and 130 may be performed are described in greater detail below.

In step 135, a determination is made as to whether an event has occurred in which the airbag is to be deployed. This event may correspond to an accident, as indicated by one or more standard sensors in a vehicle. Such sensors include, for example, crash sensor 1810 (see FIG. 18), which detects movement of one or more components in the hood of the vehicle.

If the determination in step 135 is that no accident has occurred (which is almost often the case), then one or more steps of the method may be repeated, so that the deployment of the airbag will be ready if in fact an accident does occur. In one embodiment, a method such as described in FIG. 1 is repeated beginning with step 130.

When an accident does occur, following step 135, step 140 provides that the position of the tracking feature is tracked, or at least obtained. The step may be performed using depth image data from sub-step 142 of step 105, meaning the depth image data is obtained rapidly.

In step 150, control data for deploying the airbag is determined and outputted. The control data may be based at least in part on the position information determined in step 140.

While an embodiment such as described assumes the occupant information is occupant classification and tracked position information, various other types of occupant information may be obtained from the use of a sensor system such as described. Such other types of occupant information may be used for purpose of the intelligent deployment of an airbag. Examples of other types of occupant information include the pose of the occupant, another object that the occupant is holding or sharing the region above the vehicle seat with, or an identification of the occupant.

3.0 Sensor System for Determining Occupant Information

A sensor system such as described in this section is capable of obtaining images containing depth and brightness data from a scene that contains a target car seat for an airbag. Such a sensor system may be used to perform step 105 of a method such as described in FIG. 1. As will be described, embodiments of the invention optically sense the occupancy of a car seat, account for movement or variations in the occupancy, and/or resolve environmental issues that would otherwise impede the ability to optically sense the occupancy.

Reference is made to the following patents and publications of Applicant, which include teachings of sensor systems and sensor system features which can be employed with embodiments described herein: U.S. Pat. No. 6,323,942, entitled "CMOS Compatible 3-D Image Sensor; U.S. Pat. No. 6,515,740, entitled "Methods for CMOS-Compatible Three-Dimensional Image Sensing Using Quantum Efficiency Modulation"; and international patent application PCT/US02/16621, entitled "Method and System to Enhance Dynamic Range Conversion Usable with CMOS Three-Dimensional Imaging", filed on May 23, 2002. All of the aforementioned patents and patent applications are hereby incorporated by reference.

3.1 Sensor System Components

Figure 2:
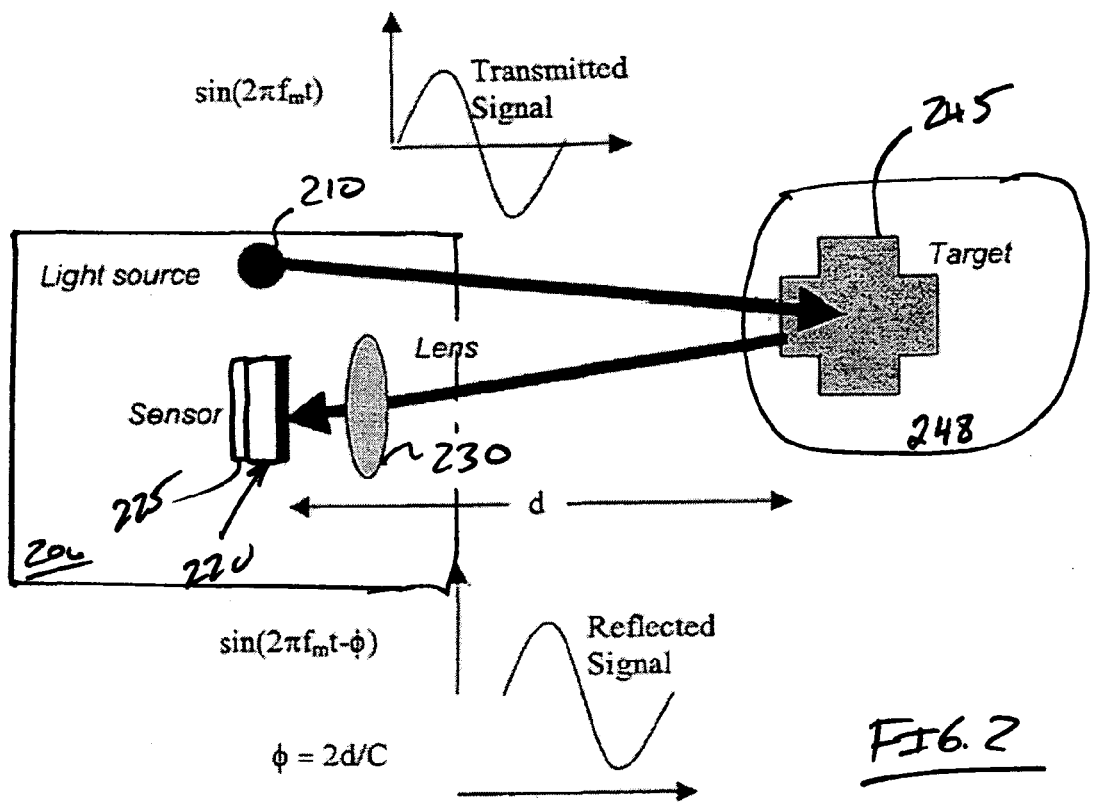
FIG. 2 illustrates a sensor system for determining occupant information, under an embodiment of the invention.

FIG. 2 illustrates a sensor system for determining occupant information, under an embodiment of the invention. In one embodiment, components of a sensor system 200 for obtaining depth image data include a light source 210, a complementary metal oxide semiconductor ("CMOS") sensor 220, a lens 230, and control logic or processing resources 240. Light source 210 may be a laser or light-emitting diode (LED) whose intensity is modulated by a periodic signal of high frequency. The CMOS sensor 220 may include a pixel array 225, or other arrangement of pixels, where each pixel is capable of detecting the intensity and phase of the photonic energy that impinges upon it. The lens 230 is configured to focus light reflected from a scene 248, containing an occupant 245, onto the CMOS sensor 220. The control logic 240 provides a proper sequence of operations that formats pixel data obtained by the CMOS sensor 220 into a depth map and a brightness image.

According to one embodiment, the output from the sensor system 200 includes three types of information: (1) depth information from each pixel of the CMOS sensor 220 to a corresponding location on the scene 248; (2) ambient light intensity at each pixel location; and (3) the active illumination intensity at each pixel location. "Depth image data" may refer to any combination of these three types of data. These three types of information are used by the reasoning software, described in subsequent sections. The depth information enables the position of the occupant to be tracked over time, particularly in relation to the occupant's proximity to the site of deployment. The active illumination intensity and ambient light intensity are different types of brightness images. The active illumination intensity is captured from reflections of an active light (such as provided by light source 210) that is reflected off of the target. The ambient light image is ambient light reflected off of the target. The two images together provide additional robustness, particularly when lighting conditions are poor, or there is excessive ambient light present. In one embodiment, brightness data is used to determine when an occupant is present in a target car seat.

Compared to a conventional, two-dimension image sensor system where only the ambient light intensity can be detected, sensor system 200 is configured to provide added kinds of information (especially the depth). This multitude of information enables compact and robust detection algorithm development for determining occupant position that would not otherwise be possible with the conventional two-dimensional sensor systems.

Embodiments of the invention provide that sensor system 200 obtains depth and other image data from scene 248, where the scene contains a car seat, and possibly occupant 245. Such occupancy information may include a classification of the occupant, as well as position information of the occupant 245, even as the occupant moves. In one embodiment, an image segmentation and classification algorithm (provided below) is performed using sensor system 200. As will be described, such algorithms may be used to classify and detect the position of head/neck/torso of a passenger. Information provided by these algorithms, as well as the distance measurement information obtained from the sensor system 200, are used to feed data into processing resources 240 for purpose of determining the proper airbag deployment.

3.2 Time-of-Flight Operations of Sensor System

The sensor system 200 operates on the principle of time-of-flight, and more specifically, on detectable phase delays in a modulated light pattern reflected from scene 248. FIG. 3 illustrates an analysis of how sensor system 200 may operate, according to one embodiment of the invention. The intensity of light from light source 210 may be modulated at a high frequency $f_m$. The intensity may then take on the form of a periodic waveform such as:

$$F = A(1 + \sin(2\pi f_m t)) \tag{1}$$

where A is the maximum light brightness. Of course, other periodic waveforms (e.g. square waves) may be used. For mathematical simplicity, it is assumed that the intensity takes the form $F = A \sin(2\pi f_m t)$. This modulated light may be directed towards scene 248, which contains occupant 245 on the target car seat. The modulated light then reflects off of surfaces in the scene. This reflected light is received by the lens 230. The lens 230 then focuses this light upon pixel array 225 of CMOS sensor 220. Assuming that the light signal can be characterized by $\sin(2\pi f_m t)$, the return signal can then be characterized by $\sin(2\pi f_m t - \phi)$. This signal is then mixed back with the modulation signal $\sin(2\pi f_m t)$ to yield:

$$M_1 = A\sin(2\pi f_m t - \phi)\sin(2\pi f_m t) \tag{2}$$

$$= \frac{A}{2}(\cos(-\phi) + \cos(4\pi f_m t - \phi))$$

After low pass filtering, only the low frequency component $$N_1 = \frac{A}{2}\cos(-\phi) \tag{3}$$

is obtained.

Another measurement is also taken with the reflected signal mixed with $\cos(2\pi f_m t)$ instead of $\sin(2\pi f_m t)$ to yield:

$$M_2 = A\sin(2\pi f_m t - \phi)\cos(2\pi f_m t) \tag{4}$$

$$= \frac{A}{2}(\sin(-\phi) + \sin(4\pi f_m t - \phi))$$

which after low pass filtering yields $$N_2 = \frac{A}{2}\sin(-\phi) \tag{5}$$

From these two measurements both brightness A and phase $\phi$ can be obtained by:

$$\phi = -\tan^{-1}\left(\frac{N_2}{N_1}\right) \quad (6)$$

$$A = 2\sqrt{N_1^2 + N_2^2} \quad (7)$$

Other periodic waveforms will require a different set of equations to obtain A and B (as will be shown later).

3.3 Photodiode Construction

The intensity signal received by the sensor system 200 consists of a combination of ambient light and modulated light reflecting off of the occupant or scene. The signal from the reflecting light, in particular light from the modulated illumination, is extremely small and thus is not amenable to being measured or manipulated directly. Because the intensity signal of the reflected light from the scene is small, ambient light may be accounted for in order to improve operability of the sensor system 200. Thus mixing it directly with a modulating signal for example with electronics such as Gilbert cells is impractical. Instead, the sensitivity of the light collecting photodiodes (that form the pixel array 225 of CMOS sensor 220) is modulated. Thus for every photon, fewer electrons are generated during time of lesser sensitivity and more electrons are generated during periods of greater sensitivity. The total number of electrons integrated over time is then the low pass filtered value of the resulting mixed signal. Additional techniques for removing ambient light is described in greater detail in the next section.

Modulation of the sensitivity of the photodiode may be accomplished in a number of ways. FIGS. 4A and 4B illustrates a variable sensitivity diode structure that can be used for purpose of modulating the sensitivity of the photodiode. In FIG. 4A, a photodiode quantum efficiency modulation (PQEM) structure 400 is provided in which a poly gate 410 is placed right beside a photodiode 420. A comparable PQEM structure 450 is shown with FIG. 4B. The PQEM 450 includes another poly gate 460 adjacent to photodiode 470. In PQEM structures 400, 450 such as shown by FIG. 4A and FIG. 4B, the gate bias voltage may be varied in order to modify the charge collection region of the diode 420, and hence its quantum efficiency. FIG. 4A corresponds to the PQEM structure 400 with a low gate voltage, so that its charge collection 415 region is small. FIG. 4B corresponds to the PQEM structure 455 with a high gate voltage, so that its charge collection 455 region is relatively large.

FIG. 5 illustrates that a differential pixel structure may be formed by combining PQEM structures 400, 450 into one combined structure 500. In the structure 500, the signals that apply to the opposite gates 510, 560 (from respective PQEM structures that correspond to those described in FIG. 4) have 180° phase difference. Since the ambient light contributes to the common mode signal in the two differential outputs while the modulated light contributes to the differential mode signal, by subtracting the differential outputs from each other, the effect of ambient light is subtracted from the measurement. Thus, a depth or intensity image with ambient light subtracted may be obtained. However, because the shot noise caused by ambient light is still present even after subtraction, the presence of ambient light will degrade the performance of the system by degrading the SNR.

The differential structure in FIG. 5 provides only one example of how depth image data and ambient light reduction may take place. More advanced pixel structures can be found in U.S. patent application Ser. No. 10/464,299, entitled "Methods and Devices for Charge Management For Three Dimensional and Color Sensing," filed Jun. 17, 2003; U.S. Provisional Patent Application No. 60/393,408, entitled "3D Image Sensing Using Differential Charge Transfer Method," filed Jul. 1, 2002; and U.S. Provisional Patent Application No. 60/396,422, entitled "Local Charge Collection Based on High Speed QE Modulation Structures", filed Jul. 15, 2002. All of the aforementioned applications are hereby incorporated by reference for all purposes. Additional materials related to differential structures are described in Applicant's U.S. Pat. No. 6,580,496, entitled "Systems for CMOS-Compatible Three Dimensional Image Sensing Using Quantum Efficiency Modulation." The aforementioned patent is incorporated by reference herein for all purposes.

3.4 Optical Sensor Description

FIG. 6 illustrates an optical sensor system for obtaining depth and brightness image data, under one embodiment of the invention. The optical system 600 may include a low power light source 610, light source driver 620, light beam shaper 630, a focusing lens 640, and a light sensitive sensor 650. The wavelength for the active illumination is preferably in near infrared (IR) range, between 700 nm and 800 nm. Light with longer wavelength than this range penetrates much deeper into the bulk region of the silicon and the generated photoelectrons become harder to collect. The light source 610 can be either low cost laser diode or LED, with either source meeting eye safety regulations through the use of diffusers.

The laser power requirement for a certain system performance can be calculated as described. If the assumption is made that the reflective object is a certain distance $l$ away from the light source 610 and sensor 650, the square object side length is x and total illumination area is $\pi x^2/2$. Suppose the focusing lens 640 diameter is d, then the lens capture ratio for the object with a Lambertian surface is:

$$\alpha = 1 - \cos\left(\frac{d}{2l}\right) \quad (8)$$

Furthermore, the assumption can be made that the power loss from the light source 610 is $\eta_1$ and the loss from focusing lens 640 and light sensor 650 is $\eta_2$. With these assumptions, the object surface has a reflection ratio of $\beta$. Given a sensor with N×N pixel array and each pixel with photodetector area of A, the reflected light power impinges on each photodetector is therefore:

$$P_1 = \beta\left(\frac{2P_{laser}\eta_1}{\pi x^2}\right)\left(\frac{l^2}{f^2}A\right)\alpha\eta_2 \quad (9)$$

where $P_{laser}$ is the output laser power and $f$ is the focal length of the focusing lens 640.

The strongest ambient light source is the wideband sunlight. A filter (not shown) may be applied in front of the lens so that most of the sunlight is blocked. Given an ambient light power spectrum of $P_{ambient}$ (W/cm$^2$/um) and a filtering bandwidth of $B_f$, the light power on each pixel due to ambient light is:

$$P_0 = \beta P_{ambient} B_f \left(\frac{l^2}{f^2}A\right)\alpha\eta_2 \quad (10)$$

The photocurrent generated by each pixel with above light power can then be calculated with known detector quantum efficiency (QE). Additional techniques for reducing the effects of ambient light are described in the next section.

3.5 Signal-to-Noise Ratio

FIG. 7 illustrates that during integration, charge is integrated on the differential photodiode A and B within each pixel. The integration time $t_{int}$ is determined by the required frame rate, normally around tens of milliseconds. The modulation clock cycle T is much shorter; at 100 MHz modulation frequency, it is only 10 ns. The final output, therefore, is the accumulated charge over million of clock cycles.

Using a square modulation signal model and assuming the structure has a perfect QE modulation ratio, (i.e., if the clock signal is high, all the generated charge is collected; if the clock signal is low, no charge is collected.) a systematic analysis can be carried out in order to illustrate the trade-off between system signal-to-noise ratio (SNR), laser power requirement and ambient light level.

FIG. 7 shows the collection of active illumination charge from photodiodes A and B where the reflected light has a phase delay of τ. The shaded area of FIG. 7 represents the active charge collection. As discussed in the previous section, the input light is a combination of constant ambient light and the modulated active illumination. If the photocurrent generated by the constant ambient light is represented $I_0$, and the photocurrent generated by the reflected modulated active illumination light is $I_1$, then the integrated charge from A and B may be represented by:

$$Q_A = n\left(I_0 \frac{T}{2} + I_1\left(\frac{T}{2} - \tau\right)\right) = \frac{T_{int}}{T}\left(I_0 \frac{T}{2} + I_1\left(\frac{T}{2} - \tau\right)\right); \quad (11)$$

$$Q_B = n\left(I_0 \frac{T}{2} + I_1 \tau\right) = \frac{T_{int}}{T}\left(I_0 \frac{T}{2} + I_1 \tau\right).$$

Signal due to active illumination from the above differential output is:

$$Q_m = |Q_A - Q_B| = \frac{T_{int} I_1}{T}\left|\frac{T}{2} - 2\tau\right|, \quad (12a)$$

which can be seen does not include the ambient light component $I_0$.

Similarly for the 90 degree (τ delayed by T/4) case we can get an equation such as:

$$Q_{m(90)} = |Q_A - Q_B| = \frac{T_{int} I_1}{T}|2\tau| \quad (12b)$$

From equation (12a) and 12(b), the active illumination light intensity $I_1$ can be estimated (subtract the two equations). Similarly, the time delay τ can be estimated from (12a) and (12b) (add the two equations). From the summation of $Q_A$ and $Q_B$, the constant ambient light intensity $I_0$ can be estimated as well after $I_1$ is determined.

The total shot noise power is:

$$\sigma_s^2 = qQ_A + qQ_B = qT_{int}\left(I_0 + \frac{I_1}{2}\right), \quad (13)$$

which includes the shot noise from ambient light. Given the additive reset noise variance of $\sigma_r^2$ (KTC noise due to the reset transistor) and the additive readout noise $\sigma_o^2$ (due to the readout circuits), the system signal to noise ratio can be written as:

$$SNR = \frac{\frac{T_{int} I_1}{T}\left|\frac{T}{2} - 2\tau\right|}{\sqrt{qT_{int}\left(I_0 + \frac{I_1}{2}\right) + \sigma_r^2 + \sigma_o^2}} \quad (14)$$

From above equation, for fixed reset noise $\sigma_r^2$ and readout circuit noise $\sigma_o^2$, SNR increases with the active illumination photocurrent $I_1$ while decreases with the ambient light power $I_0$. Ambient light has an adverse effect due to statistical fluctuations in the number of photons received. These fluctuations contribute to the shot noise, which has a Poisson distribution. For example, if ambient light generates one million electrons, its shot noise standard deviation (STD) is only one thousand electrons. Now if, for example, the signal is ten thousand electrons due to our modulated active illumination, the SNR is about $10^4/10^3=10$ and not $10^4/10^6=0.01$.

From the time of flight-phase shift principle discussed above, the maximum phase shift detectable is π/2, which is equivalent to a distance of $$\frac{c}{4f_m}$$

where $f_m$ is the modulation frequency. With light source modulated at 200 MHz, this distance is 37.5 cm.

3.6 Depth Resolution

The depth resolution is determined by the signal SNR. With a high resolution ADC such that the quantization noise is smaller than the shot noise, the depth resolution may be represented by:

$$\Delta l = \frac{c}{4f_m SNR} \quad (15)$$

The above derivation is based on the charge collection from each pixel with certain integration time. Thus the above equation is a per-pixel and per-frame based RMS result. With time and spatial averaging, the depth resolution can be further improved. For example, by binning 2×2 pixels together, the SNR is doubled, therefore the minimum resolution becomes half.

3.7 Sensor System Stimulation Results

Using Equation (9) and (10) in the above discussion, the optical power impinges on each pixel can be calculated. FIG. 8A plots the optical power for each pixel due to active illumination on a 0.64 m² area (0.8 m*0.8 m). FIG. 8B plots the optical light for each pixel due to ambient sunlight on the same area.

Figure 9:
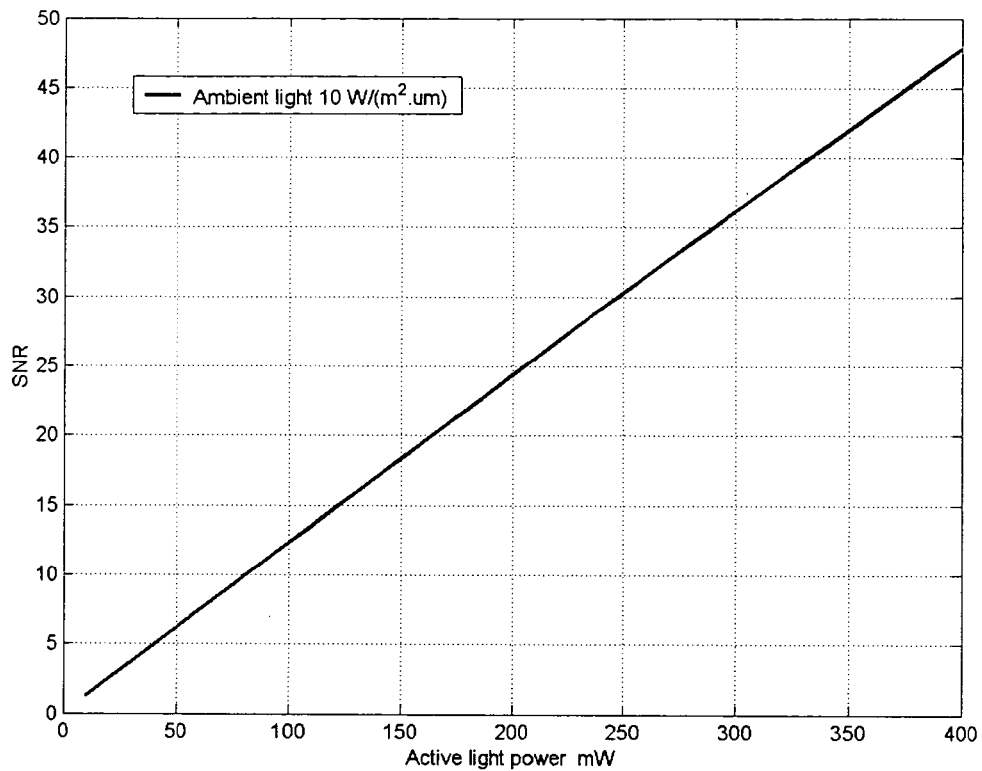
FIG. 9 provides a plot of the simulated SNR versus laser power at an ambient light of 10 W/(m$^2$.um) and other realistic assumptions.

FIG. 9 plots the simulated SNR versus laser power at an ambient light of 10 W/(m².um) and other realistic assumptions. This ambient light level is equivalent to sensor working in the shade from direct sunlight. Note that the ambient light noise has zero means. As described above, the ambient light only contributes to the shot noise. The noise figure can be improved by increasing the integration time (or averaging over multiple frames) or by averaging over several pixels or a combination of both. The resolution plotted is per pixel per frame.

Figure 10:
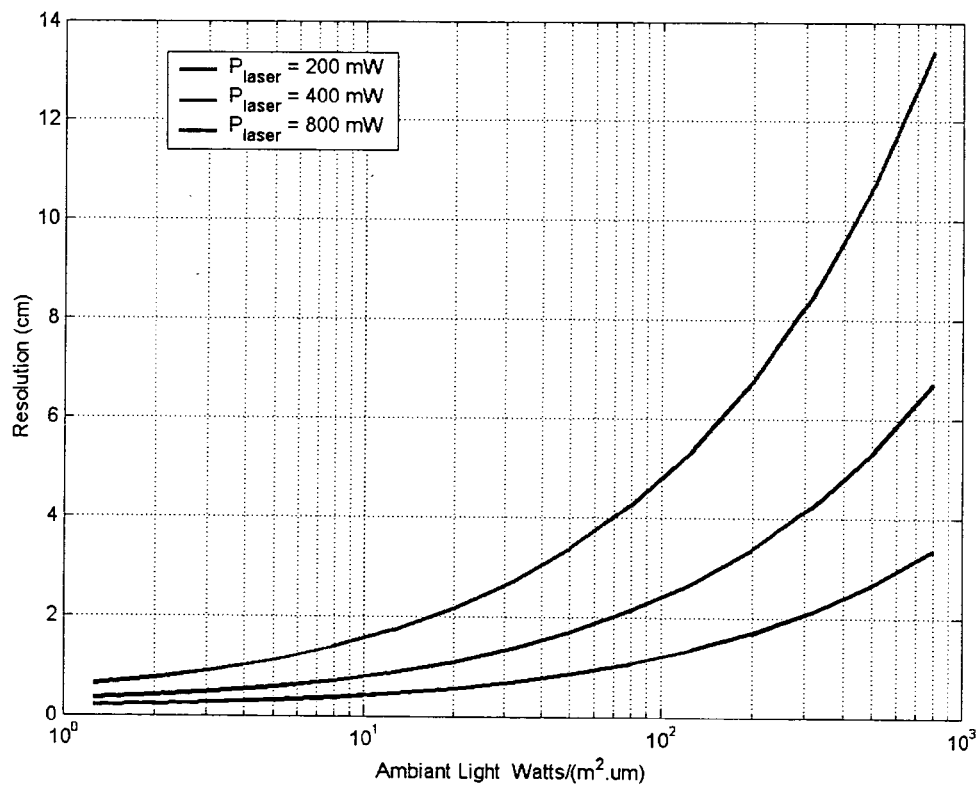
FIG. 10 provides a plot of the depth resolution versus ambient light power at three laser power levels.

FIG. 10 plots the depth resolution versus ambient light power at three laser power levels. Again this resolution is per pixel per frame. Because the ambient light noise has zero mean, improvements can be made by space and time averaging.

An embodiment such as described in FIG. 2 and elsewhere in this section operate under principles of time-of-flight, it should be noted that other types of sensors systems may be used to obtain depth and image data from the scene 248. These other types of sensor systems may substitute for sensor systems that operate under the principle of time-of-flight, as described above.

3.8 Use of Signal Processing and Innovative Sensor Operation

Signal processing and innovative sensor operation may be applied to embodiments described above in order to further enhance performance. Other benefits, such as reduction of requirements for the laser power for the optical sensor system 600 (FIG. 6) may also be achieved.

Examples of such operations include pixel binning. Pixel binning refers to when the the charge from multiple pixels output are combined together to form one jumbo pixel. The SNR increases as the effective pixel area increases. The spatial resolution of the sensor, however, will decrease. Therefore this is a tradeoff between depth resolution and spatial resolution. This operation is akin to spatial or temporal averaging.

Another example is estimating object/occupant velocity from angular displacement. Since the movement of the object/occupant is not always perpendicular to the sensor surface, one can calculate the object velocity by looking at the pixel displacement across a sequence of frames. This principle is illustrated in greater detail below, in the discussion of FIG. 13.

4.0 Technique for Reducing Effects of Ambient Light from an Optical Sensor System As described above, it is desirable to remove the effects of ambient light. In the context of airbags, ambient light that is unaccounted for may confuse the sensor for deploying the airbag. The result may be ineffective airbag deployment, or deployment at power levels that are dangerous to the occupant. The following description provides a technique for removing ambient light from an image captured by a depth perceptive sensor. While a technique for accounting for ambient light is described herein in the context of determining airbag deployment, it should be apparent that such a technique has applications beyond the context of airbag deployment. In fact, ambient light is problematic in many optical sensor applications, such as facial recognition or object tracking.

In one embodiment, the effects of ambient light may be reduced or minimized in multiple domains, and in particular, in the optical domain, electrical domain and algorithmic domains. First light optical filters are used to remove wavelengths different from the wavelength of the light source. Examples of such filters include hot or cold mirrors, substrate filters, Dichronic filters or interference filters. These types of filters are described in publications such as the Edmund Industrial Optics Catalog. In order to block the maximum amount of ambient light, filters with very narrow bandwidths are used. Typically, such filters are interference filters. Filters with a bandwidth as low as 10 nm may be used to remove the vast majority of ambient light (perhaps a 50× reduction).

Unfortunately such filters have an angle dependency. This means that the pass band center wavelength depends on the angle of incidence of the incoming light. For a wide angle lens, if the filter is placed in the front of the lens, the wavelengths allowed to pass for objects in the center of the scene are different than those allowed to pass at the edges (high angle) of the scene. A lens and filter combination can be configured to result in the filter bandwidth being wide enough so that enough of the light source wavelength gets through regardless of incidence angle.

Figure 11:
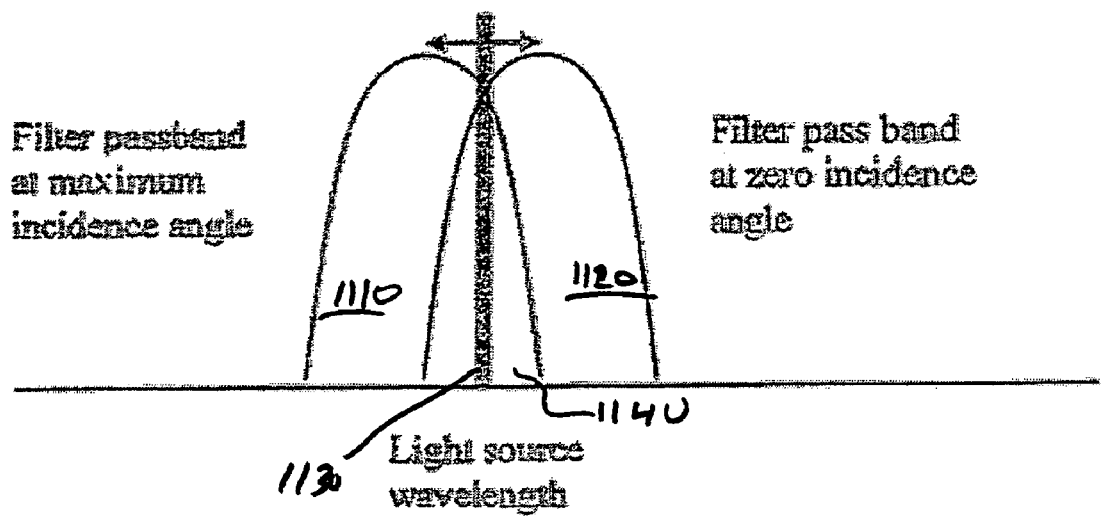
FIG. 11 is a passband diagram that illustrates a light-filtering principle for filtering ambient light, according to one embodiment.

FIG. 11 is a passband diagram that illustrates this principle. A first passband 1110 is for a maximum incident angle, and a second passband 1120 is for a minimum or zero incidence angle. A range of wavelengths 1140 represents a domain where the first passband 1110 and the second passband 1120 intersect. A source wavelength 1130 for the source light of the optical sensor is within the intersection of the first passband 1110 and the second passband 1120.

According to one embodiment, narrow band pass interference can be attained by placing the filter at a location in the optical path where angle variation is low. This may be in the front, back or middle of the lens. Also the lens may be designed, through techniques known in the art, so that there is a location in the optical path with low incident angle variation. For example, a lens designed to be telecentric would have less angle variation in the image plane. The angle of incidence may also be reduced (further or not) in the image plane by reducing the numerical aperture (increasing the F#) of the lens.

Even with the use of high performance optical filters, certain environmental conditions may cause enough ambient light to be present to overwhelm a sensor system, such as described above, which uses optics to obtain occupant data. The ambient light may be so intense as to cause the pixels to saturate. Ambient light appears as common mode and techniques to restore common mode (called common mode reset) are described in Provisional patent 60/462,167, entitled "Differential Dynamic Range Enhancement Methods and Systems," filed Apr. 11, 2003.incorporated herein by reference. Such techniques allow the pixel to handle much higher levels of ambient light without saturating.

Signal processing may be used to remove signal frequencies different from the modulation frequency of the light source. For example, ambient light is usually a constant signal that appears at a base band (zero frequency) that can be readily removed. However, other noise signals may be present at other frequencies as well, and these ambient signals can be removed for improved performance. In electronic circuits, there are a variety of mechanisms that generate noise in the system. Such noise may be shot noise, thermal noise, flicker noise or popcorn noise and they are present at many frequencies. Because such noise is usually broadband and not concentrated at the modulation frequency, by removing out of band signals not close to the modulation frequency the amount of noise that affects the system is greatly reduced and resolution is improved.

In another embodiment, the effects of ambient light may be further reduced by image processing techniques that may estimate the amount of ambient light and correct for it.

In addition to filtering, the scene may be illuminated in a manner that optimizes results. Because of the optical losses in any sensor system, the illumination pattern required for a beam that illuminates a screen at a fixed distance is such that the sides of the screen are illuminated more intensely than the center. However, for a sensor system that optically obtains occupant data, these high sensor angles may not be coincident with occupants at a far distance. Because of the car cabin geometry (shown below is the case where the sensor is directly in front of the passenger) occupants that are at a corner or side of the image cannot be far from the sensor. Taking account the exact dimensions and chacteristics of the cabin, the intensity profile of light source can be tailored so that pessimistic corner cases that never occur do not recive undue amount of illumination. This translates in a more effective use of the light source where areas that require extra lighting can be brightly lit with the same amout of total lighting.

Figure 12:
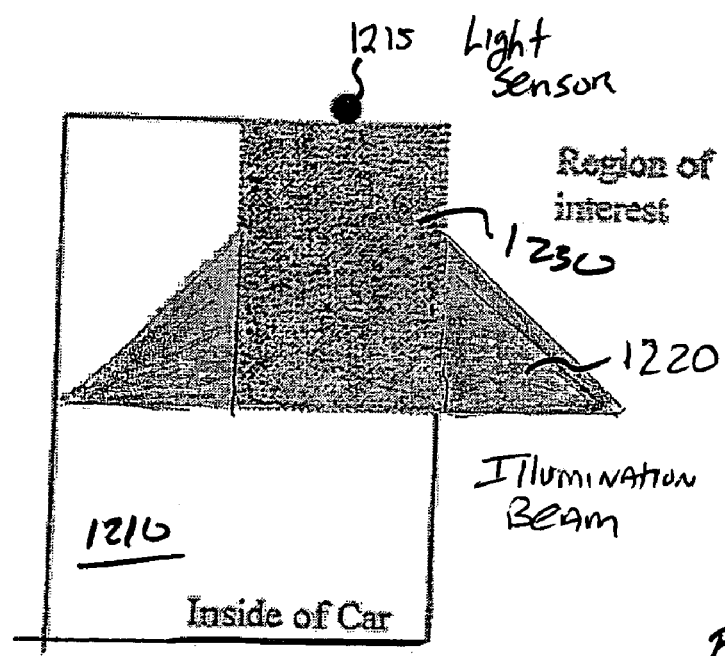
FIG. 12 illustrates how an optical sensor light may be used to optimize results, under one embodiment of the invention.

FIG. 12 illustrates how the optical sensor light may be generated to optimize results. A car cabin 1210 includes a light sensor 1215. A region 1220 within the view of the light sensor 1215 is represented by the triangle. However, the portions of the region 1220 that do not intersect with the region of interest 1230 can all but be ignored. Thus, the region of interest 1230 is brightly lit for purpose of obtaining occupant data. The intensity profile of the light emitted from light sensor 1215 is tailored for the area of interest 1230, and not for regions outside of the region of interest 1230.

5.0 Sensor Mounting Configuration

Figure 13:
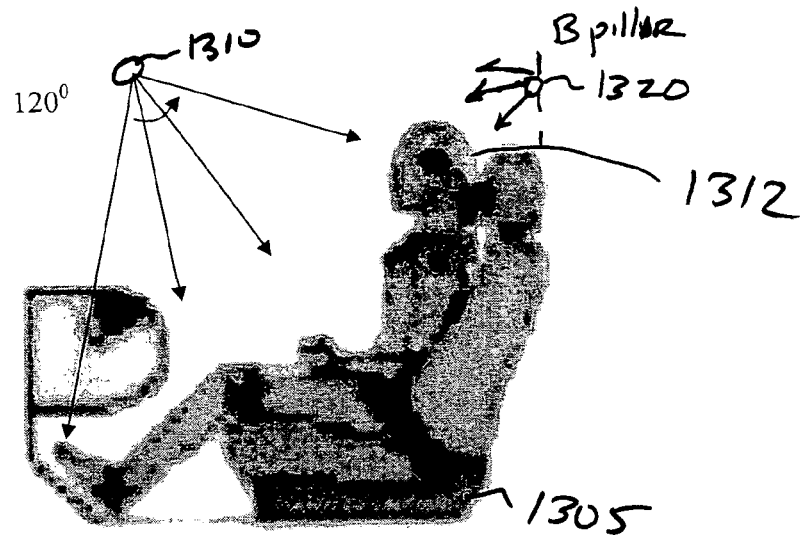
FIG. 13 illustrates a mounting configuration using one or more sensor systems, such as described in FIG. 2.

FIG. 13 illustrates a mounting configuration using one or more sensor systems, such as described in FIG. 2. In one embodiment, two sensor systems, each for obtaining depth image data, are used for one car seat 1305. In a configuration of FIG. 13, a main sensor system 1310 is mounted overhead right above the rear view mirror. In addition to main sensor system 1310, one embodiment provides a second sensor system 1320 for one or more car seats and/or passenger. While the main sensor system 1310 may be oriented to view an occupant 1312 or the seat 1305 in a front and downward direction (shown by reference arrow A), second sensor system 1320 may be oriented to view the occupant and/or car seat 1305 from the back (shown by reference point B, coming out of the paper). The mounting position for the second sensor system 1320 may be on the B-pillar looking forward. The second sensor system 1320 may operate as a backup sensor in case some objects block the main sensor view.

Embodiments of the invention provide that the main sensor system 1310 and the second sensor system 1320 each illuminate the cabin, and specifically the scene that contains the occupant. Reflections from the illuminations are used to obtain the occupant image data. Several light sources may be used, rather than just the one light source 210 described in an embodiment of FIG. 2. In one embodiment, the total illumination area can be divided into several sub-regions, such as one light source covering the bottom seat and one source covering the seat back and head restrain. The output power of each light source can, therefore, be reduced. Also using a multitude of less divergent sources reduces the total theoretical illuminated area at the maximum distance.

6.0 Reasoning for Intelligent Deployment of Airbags

Embodiments of the invention use reasoning software (or comparable coding) to determine or indicate if, when and/or how an airbag is to be deployed. The following sections describe the reasoning software. In one embodiment, the reasoning software uses three types of input from a sensor system such as described above. The three types of input include (i) a depth map, (ii) a reflectivity based intensity image, and (iii) a regular intensity image. The reasoning software uses the inputs to make correct decisions on the operation of the airbag. In one embodiment, the reasoning software uses algorithms which accumulate an increasingly better knowledge of occupancy data, including occupant type. The reasoning software effectively applies methods to selective segments of the image in order to identify and improve critical depth measurements in short amount of time intervals. Among the determinations made by the reasoning software are (i) occupant classification, and (ii) occupant position. Table 1 is an example of how various the various inputs from the sensor system can be applied for the intelligent deployment of an airbag.

TABLE 1

Examples of deployment settings based on occupancy data obtained from sensor system.

| Name of the Case | Necessary Action |
|---|---|
| Regular size person sitting at far distance | Must Fire |
| Regular size person sitting at far distance holding an object (box, newspaper) | Must Fire |
| Regular size person sitting at medium distance | Depowered Fire |
| Regular size person sitting at medium distance holding an object | Depowered Fire |
| Regular size person sitting at far distance With his leg on top of the airbag | Depowered Fire |
| Car seat is empty | No Fire |
| A non-person (i.e. a box) is on the seat | No Fire |
| Regular size person sitting at near distance holding or not holding an object | Must Not Fire |
| Small size person, child, or child seat sitting at any distance holding or not holding an object | Must Not Fire |

In order to satisfy these requirements, may determine occupancy type. In one application, occupancy classification is based on one or four categories:

Empty: The car seat is empty

Non-person: This category includes non-person objects, boxes, bags, etc.

Child: This category may include (i) child in a child seat, (ii) child in a rear facing child seat, (iii) child in a forward-facing convertible child restraint system, (iv) child in a booster, (v) any child having height, weight or other physical characteristics of age 6 or less.

Adult: This category includes any adult greater than 5% female.

For occupant position, one embodiment provides that the reasoning software reports the location of the head as the occupant location, since the torso and the neck of the person moves with the head all the time. Alternatively, other body parts, such as the torso, chin, eye, nose, and/or extremities may be monitored to determine the occupant location.

Table 2 describes an overview of events to be reported in a typical automobile at every instant after the engine is started. In order to satisfy all the requirements given in Table 1 and Table 2, it is then sufficient to determine the occupant type category and occupant location. We describe the technical overview of each of these problems and the overall system design in the following sections.

TABLE 2

The time-chart of reports.

| Time Interval | Required Event Report | Type of Processing |
|---|---|---|
| 3 to 5 seconds after start-up | Occupant type, occupant position | Initial Processing |
| Every 1 to 2 seconds thereafter | Occupant type, occupant position | Intermediate Processing |
| Every 2 to 10 milliseconds after the acceleration based collision signal. | Occupant position. | Fast Processing |

As noted in Table 2, the determination of occupant position may be important at every instant of the sensor system's operation. The occupant position in relation to the site of the airbag deployment may be needed to determine whether deployment of the airbag should be depowered or disabled. This determination may be made independently of occupant classification. If, for example, during an accident the occupant comes near the site of deployment before the airbag is deployed, reduced power may be warranted. If the occupant is on the dash or otherwise adjacent to the site of deployment, no airbag deployment may be warranted, as certain death or serious injury may result. For this reason, one embodiment provides that the occupant position is monitored carefully at all times before the airbag is deployed, both before and after the occurrence of an accident. Variation in monitoring speed is needed in order to adequately determine occupant position in various instances, including just after a collision. Depending on the proximity of the occupant to the site of deployment, deployment may be reduced or disabled in order to avoid more serious injury to the occupant.

6.1 Software Architecture and Overview

The seat-occupant detection, localization, and classification system may need to operate under a wide variety of lighting conditions, and with occupants of different shapes, sizes, and appearance. At the same time, a high degree of reliability is necessary in the final decisions and estimations, whether these are three-dimensional coordinates of parts of the occupant's body or the results of classifying the occupant into one of several body types. To address this dilemma, a layered reasoning system will be interposed between low-level data processing and eventual system outputs, with the aim of achieving reliable results based on long sequences of possibly unreliable data (due to occlusions, abrupt environmental changes or due to diversity of situations).

Figure 14:
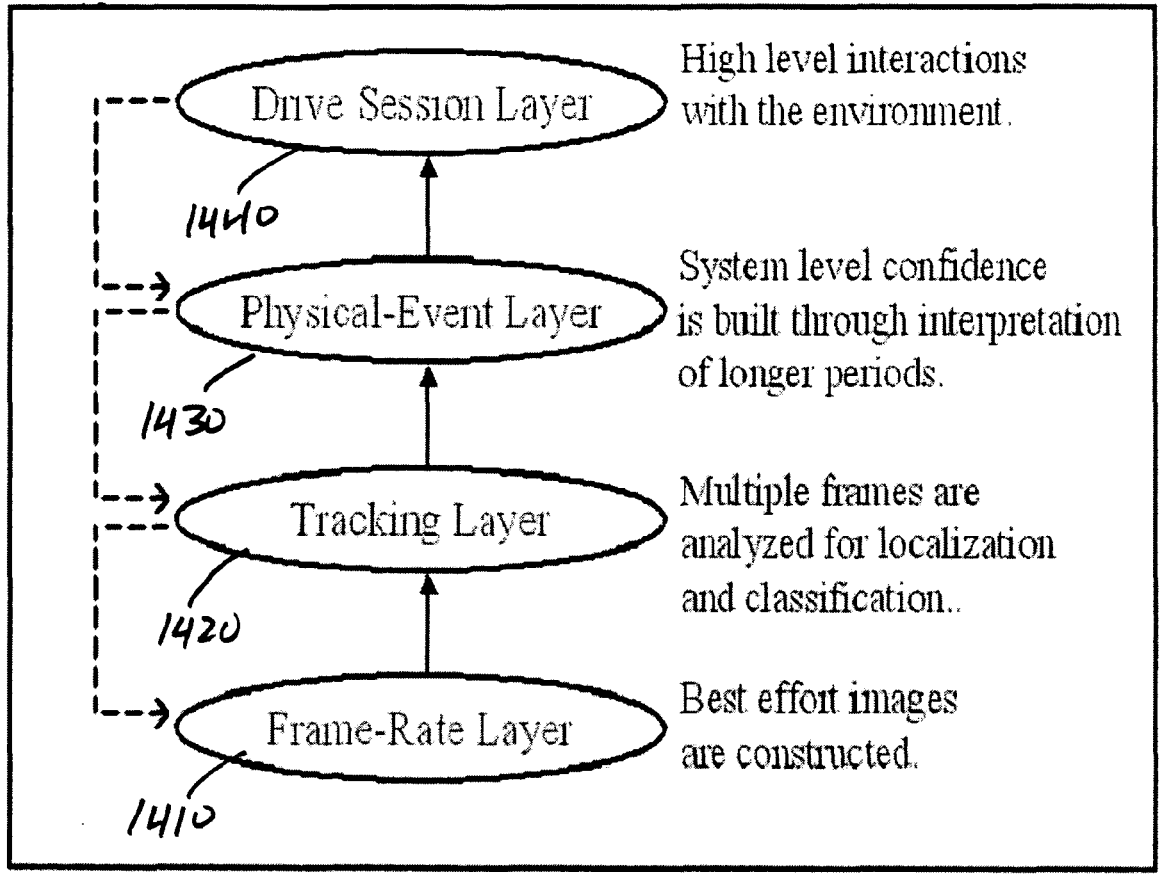
FIG. 14 illustrates a layered architecture for reasoning software used in determining airbag deployment, under one embodiment of the invention

FIG. 14 illustrates a layered architecture for the reasoning software, under one embodiment of the invention. The layers of the reasoning software may include the frame-rate layer 1410, the tracking layer 1420, the physical layer 1430, and the drive session layer 1440. The layers of the reasoning software may correspond to the different time constraints at which different types of events occur. According to one embodiment, it is assumed that any accident is unlikely in the first few seconds of starting a car. With this understanding, observations as to what occupies the seat before the crash is well classified before the time of a crash. Therefore, during the last milliseconds after the crash and before deployment, the tracking system works with a good knowledge of the occupant type and initial occupant location needed to make fast decisions regarding occupant location.

The layered reasoning system is used for building the confidence level to the system. Although, each frame might give a low-level decision based on the frame data, a big information network is built in the system level to trigger the possibly unreliable frame decisions into reliable system decisions. There are various solutions for building such an information network. One alternative is to construct a Bayesian network where the decisions coming from each frame are weighted by a probability depending on the system's confidence level. Decisions below a confidence level (i.e. in very abrupt lighting conditions) can be totally discarded, while decisions above a certain confidence can be accepted with full confidence. As a consequence, as many frames build up, the system's overall occupant classification becomes more and more confident due to the overall reasoning strategy. The layers of the reasoning system are described herein.

In the frame-rate layer 1410, sensor data from each frame are processed to compute the best possible depth map, color, or luminance image that is possible under the current set of circumstances. This is the lowest level of processing. Time constraints are of the order of tens of milliseconds. In the normal mode, the frames are minimally marshaled. Pixel binning can be applied to improve depth (spatial averaging). A lower resolution (around 5 cm) could be temporarily enough for tracking the head.

In the tracking layer 1420, several frames may be combined to counter the effects of noise and other imaging artifacts (temporal averaging). Coordinates may be tracked over time. During the normal operation, more meaningful localization and classification are pursued in this level. During the crash, the fast head track processing occurs at this level and frame-rate level based on the prior analysis. Time constraints at this level are of the order of hundreds of milliseconds.

The physical-event layer 1430 is characterized by time constraints of the order of one to two seconds. In this layer, changes and motions in the scene can be modeled and analyzed with two different purposes: First, statistics can help distinguish occupant motions from variations of coordinates and shapes that may occur as a consequence of sensing errors. Second, occupant motions can be classified in order to distinguish animate from inanimate occupants, and perhaps provide indications for even subtler distinctions. At this level, measurements of light distribution and overall scene motion may also be made, in order to establish how reliable the sensor measurements are likely to be at any point in time. For instance, high levels of ambient light may indicate that laser-based depth measurements are less accurate. In addition, at this level, the system attempts to understand if the occupant changes body pose, or position in the seat. The classification results occurring at the lower levels are clustered and analyzed using an intelligence network in order to identify results that persist over longer periods of time.

Finally, a drive-session layer 1440 attempts to identify phases of traffic, and the beginning, interruptions, and end of a single driving session. These events occur at time constraints of several minutes to hours, and may use information from other sensors (engine status, odometer, seat belt tensioners, and so forth) to guide reasoning heuristics at the layers below. For instance, if the vehicle is stationary, the engine is off, and a door is opened, changes of occupant may be expected with some likelihood. On the other hand, a stop with closed doors and a running engine may be simply a stop at a traffic light. Depending on the circumstances, prior estimates about the seat occupant may be preserved (traffic-light stop) or erased (change of occupant). This level is mostly to be designed in conjunction with the automotive client.

FIG. 14 further illustrates the reasoning layers and the tasks achieved in each layer. It should be noted that the high level layers can always provide feedback to low level layers. For example, once the outline of the subject's head is determined in the tracking layer, the frame rate layer 1410 can average only over the head to have a better depth calculation on the head. Similarly, the physical-event layer 1430 can provide feedback regarding occupant type, which could further be used in the tracking layer 1420 for the supervision of tracking. The drive session layer 1440 provides feedback regarding the automobile status.

In general, the system simultaneously applies head detection and occupant classification in the tracking layer 1420. As mentioned above, the system builds up knowledge (especially regarding occupant classification) over time and characterizes it in the physical-event layer 1430. Similarly, once the head is detected (a computationally expensive operation), the head is tracked (a computationally efficient algorithm) on the consecutive frames in the tracking layer 1430. During a crash, only a few pixels on the head can be tracked in the frame rate layer 1410. This way, the system is able to satisfy high-speed requirements during an accident.

6.2 Engine Startup and/or Change in Seat Occupancy

The passenger status of a car seat is most likely to change at start-up. However, it is also possible for passenger status to change when the car has started already, such as when a driver picks up a passenger when the car is running, or even when passengers within the vehicle change seats when the vehicle is moving. Accordingly, an embodiment provides for occupant classification, even in the event of a change in the passenger status once the vehicle has started.

Figure 15:
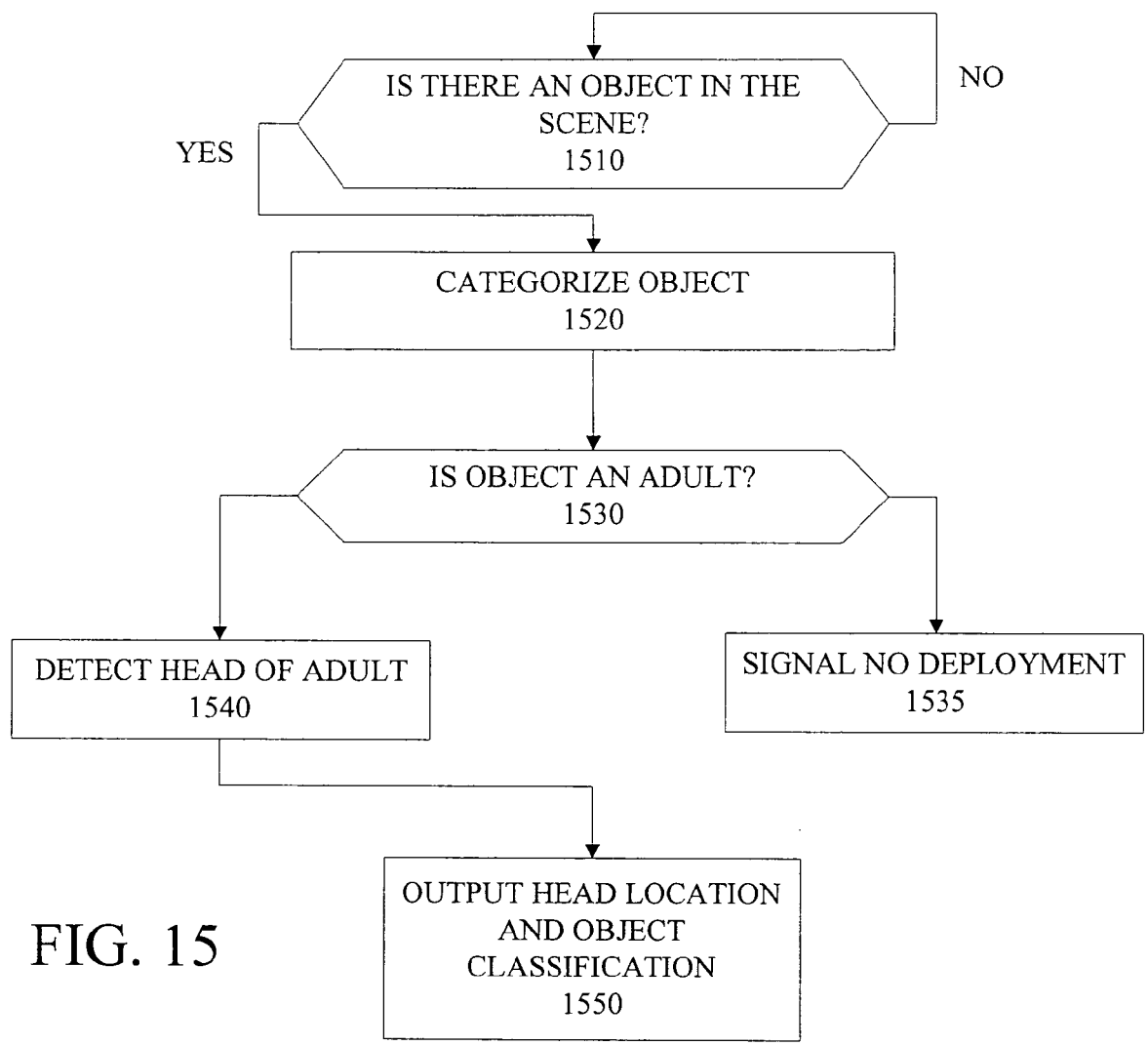
FIG. 15 illustrates a method for operating a sensor system for determining airbag deployment under an initial processing mode, according to one embodiment.

FIG. 15 illustrates logic used during the engine start-up or after a change in seat occupancy occurs. Since some of the future decisions regarding the object could be based on the initial occupant categorization, this processing can take several frames, or until the system builds up enough confidence regarding the occupant categorization and the head location if the occupant is an adult. In one embodiment, a search space for head location is used for overall image accuracy. In other words, assuming an animated object is detected, one embodiment provides that every part of the image is searched for every kind of head. For example, an image may be searched for features such as short hair, long hair, a balding head or a hat. As a trade-off, the head detection becomes a computationally demanding operation. The eventual robust decision regarding the occupant localization and classification would take place in the physical-event layer 1430.

Depth image data, including brightness and depth images, captured by sensor system 200 are used to perform steps of a method of FIG. 15. In step 1510, a determination is made as to whether there is an object in the scene (the space of the target car seat). This step may be performed by a background (seat image) subtraction. The background image can be taken a priori in the factory. This background image may be updated for illumination changes every time the driver intends to enter the car. If there is no object in the scene, the reasoning software waits and performs the step again. An object determination module may be provided in the reasoning software in order for the reasoning software to perform this step. In one embodiment, this step is performed using brightness values that are identified from the depth image data captured by the sensor system 200 (see FIG. 2).

Step 1520 provides that the object identified in step 1510 is categorized (or classified). For example, the object may be classified as empty, non-person (e.g. pet), child or adult. The child classification may result in additional categories, such as (i) child in a child seat, (ii) child in a rear facing child seat, (iii) child in a forward-facing convertible child restraint system, (iv) child in a booster.

Step 1520 may be performed using various heuristics and classification based algorithms. Heuristics-based algorithms make a decision based on size related measurements on the occupant. These measurements include the height and area of the occupant body, or the size of the face of the occupant. With the inclusion of a depth map or image (obtained by, for example, the sensor system 200 in FIG. 2) of the target, the distance of the occupant from the site where the airbag is deployed becomes known. Given the depth information, it is possible to determine the head size, and various other measurements. The classification-based algorithms involve the collection of a sufficiently large dataset of all of the occupant cases. This should include many images (either depth image, active illumination image or ambient illumination image) with adults, with children in all kind and colors of child seats, convertibles and boosters, and with non-persons. These images are next fed into a training algorithm such as nearest neighbor classification, support vector machines, neural networks or linear discriminant analysis. Details of a classification technique for use with an embodiment of the invention have been described in Applicant's U.S. patent application Ser. No. 10/375,345, entitled "Method and Apparatus for Recognizing Objects," filed Feb. 26, 2003, this application being hereby incorporated by reference in its entirety. One such technique described in the preceding application provides for classifying objects in a scene by (i) obtaining a depth image of the scene, (ii) obtaining a difference image by subtracting a known image of the scene without the occupant or object from the depth image with the object, (iii) identifying classification features from the difference image, and (iv) matching the identified features to a classification or known object. The output of the training algorithm is a classifier function, which classifies a given image into the categories of non-person, child or adult. These algorithms provide a level of confidence (probability of correct decision). It is expected that, none of these algorithms would provide a very high level of sensitivity alone. As mentioned before, a small confidence level is increased to a higher one by two means. First, the experiment is repeated many times through the drive session. Second, the multiple methods are executed on different input images in parallel for more accurate results. An object classification module of the reasoning software may be used to perform this step.

In step 1530, a determination is made as to whether the object is to be classified as an object in which airbag deployment is warranted in the event of a crash. For purpose of description, this determination is assumed to be whether the object is an adult person. If the determination of this step is negative, step 1535 provides that no airbag deployment is signaled in the event of a crash.

If the determination in step 1530 is positive, step 1540 detects a head of the object. The head may actually be in tracking feature for that person, but the head is one of the more easy features of a person to track. Various algorithms exist for the detection of heads or other tracking features of people using depth and intensity images. As mentioned, these images may be captured by the sensor system 200 of FIG. 2, or other embodiments described herein. One possible depth-based algorithm uses the body pattern to detect the location of the head and the body. An alternative method is using an ellipsoid model for the head. The ellipsoid model could be both in three-dimensions or in two-dimensions. In the case of a two-dimensional ellipsoid, the boundary of the head is modeled as an ellipsoid. The edges of the depth image are extracted for this purpose. Each edge value has a corresponding depth value from the depth map captured by the sensor system 200 (FIG. 2). The edge values with similar depth values are grouped together and an ellipse is fit to each cluster of edges. Good ellipsoid fits with the expected size and aspect ratio of a head are declared as the detected head. Similarly, for a three dimensional ellipsoid fit, the surface of the head is modeled as a three-dimensional ellipsoid. First, the regions of the depth image are grouped into different clusters, and each cluster is tested for a good three-dimensional ellipsoid fit with the expected size. Techniques based on ellipsoid-based head detection algorithms have been proposed in U.S. patent application Ser. No. 10/411,674, entitled "Subject Segmentation and Tracking Using Three-Dimensional Technology For Video Compression in Multimedia Applications," filed on Apr. 11, 2003; the aforementioned application being hereby incorporated by reference for all purposes. Another potential method is to use the body pattern (i.e. torso, shoulder and head pattern) to determine the location of the head. Such a technique is also described in the aforementioned U.S. patent application Ser. No. 10/411,674, which is incorporated by reference herein. A head detection module of the reasoning software may perform this step.

It should be noted that are various intensity based face detection algorithms that could be used in addition to the aforementioned depth based methods. These methods first construct a very large database of images of faces, and non-faces. A training algorithm, such as neural networks, support vector machines, linear discriminant analysis, or hidden markov models is executed to find a discriminating classifier function. Given a partition of an image, the classifier function determines if that partition contains an image of a face or not. While testing a new frame to see if it contains any faces, the image is first portioned in several ways (i.e. different sizes) into sub-images. Each sub-image is then fed to the classifier and tested to contain a face. Each positive test is declared as a face-detection.

Step 1550 provides that head location and occupant classification are outputted by the reasoning software. Being different from the head-detection algorithm, head-tracking uses the location and shape information from a previous frame. Therefore, the task of the head-tracking algorithm is to determine the location of the head in the current frame given the location and the shape in the previous frame. There are various algorithms for this task. One alternative is to use one of the aforementioned head detection algorithms with a relatively smaller search space. It is known in literature that most of the head tracking algorithms might lose track due to abrupt head movements, or abrupt environmental changes. When such an event happens, the system would go into the head detection mode, where it finds the head by a full search, and continues to track afterwards. An ellipse-based face tracking algorithm is described in the aforementioned U.S. patent application Ser. No. 10/411,674. This step may be performed by a head tracking module of the reasoning software.

As described previously, the system should be able to give tracking decisions in every 2~10 milliseconds in the fast processing mode. In order to achieve this, a few pixels are used for tracking instead of the whole head. The points to be tracked can be determined randomly or in a descriptive fashion on the previously detected head. There are well known methods available to get good set of features to track. Those points are then tracked between consecutive frames and a depth estimate is calculated using the depth of those pixels.

6.3 Intermediate Processing

Once the system determines the occupant categorization, and the head location (for animated objects), the system gets into the intermediate processing mode. In the intermediate processing mode, the occupant categorization is verified at the start of every frame, and the head is tracked. The head is re-detected periodically (every few seconds to make sure another occupant does not appear in the scene) or if it is lost during tracking. The difference of the head tracking as opposed to the head detection is that, there is an initial estimate of the head shape and location in the first one but not in the latter. As a consequence, the search space for the head tracking is smaller, and efficient algorithms exist for this task. These tasks occur in the tracking-layer 1420 reasoning level. In addition, system confidence is built up in the physical-event 1430 reasoning layer by accumulating the decisions from several frames.

Figure 16:
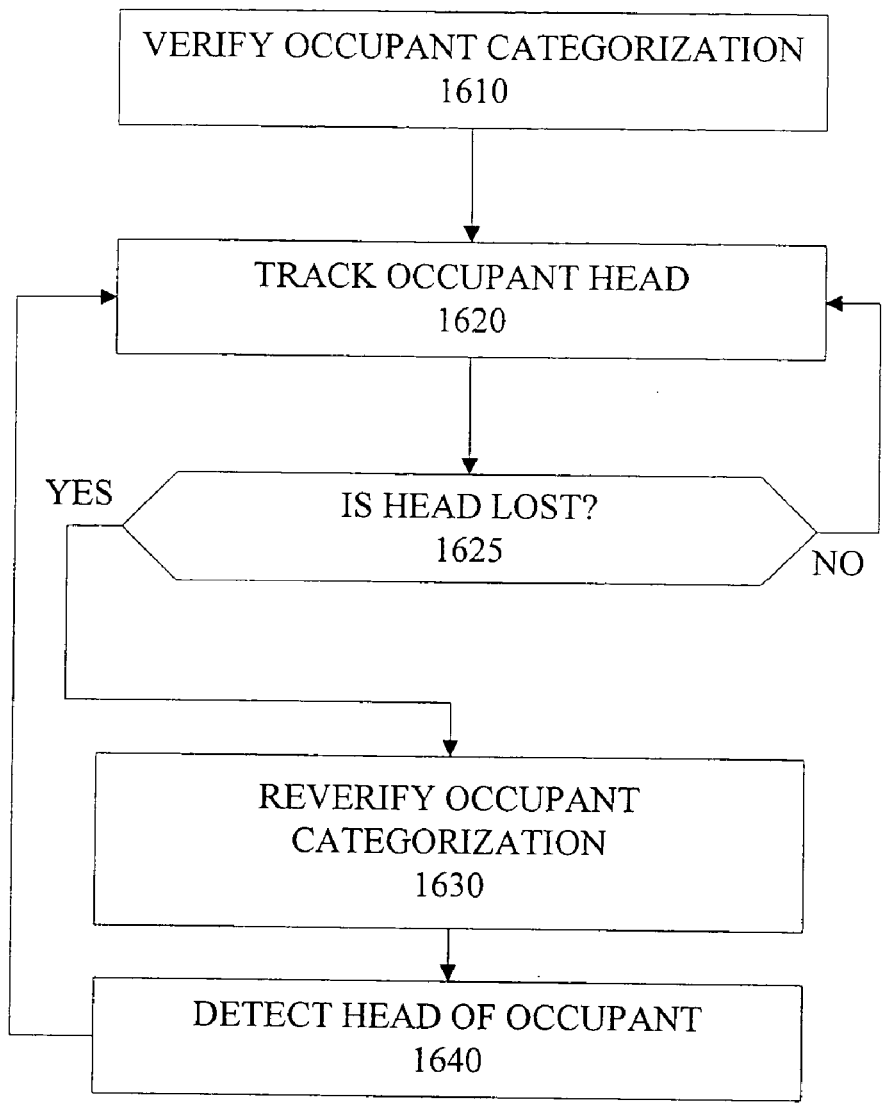
FIG. 16 illustrates a method for operating a sensor system for determining airbag deployment under an intermediate processing mode, according to one embodiment.

FIG. 16 illustrates a method operating a sensor system for airbag deployment under an intermediate processing mode. As with previous embodiments, depth image data obtained by the sensor system 200 may be used to perform one or more steps. In step 1610 provides that occupant categorization is verified. This step may be performed similar to step 1520. The object classification module of the reasoning software may be used to perform this step.

Step 1620 provides that the occupant head is tracked. This step may be performed similar to step 1550. The head tracking module of the reasoning software may be used to perform this step.

In step 1625, a determination is made as to whether the head (or other tracking feature of the occupant) is lost. For example, when an attempt may be made to periodically re-detect the head, and if the head is not detected at any instant, the determination of this step becomes affirmative. If the determination of this step is negative, then the head is continued to be tracked.

If the head is lost, the occupant is re-classified or categorized in step 1630. This step may be performed similar to step 1610. Following re-classification, the head of the occupant is detected in step 1640. This step may be performed similar to step 1540. The head detection module of the reasoning software may be used to perform this step.

The intermediate process is continuous. Therefore, following step 1640, one or more steps are repeated. In an embodiment shown by FIG. 16, step 1620 is repeated, as the occupant head has been re-detected.

6.4 Fast Processing Mode

Figure 17:
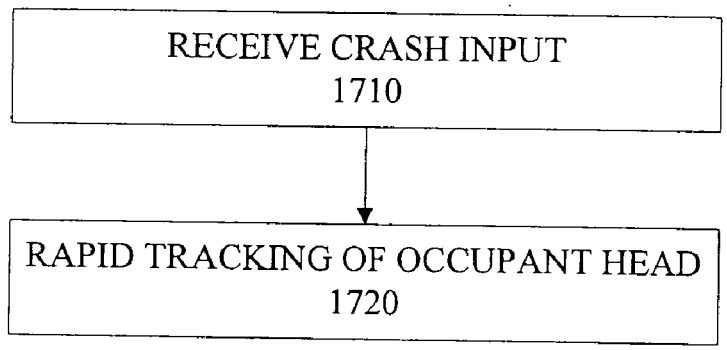
FIG. 17 illustrates a method for operating a sensor system for determining airbag system under a fast-processing mode, according to one embodiment.

FIG. 17 illustrates a method for operating a sensor system for an airbag system under a fast-processing mode, under one embodiment of the invention. The fast-processing mode may coincide with the occurrence of an accident. During an accident, the system gets into the fast processing mode (FIG. 13). In this mode, the system has to respond in less than 10 milliseconds such that the airbag deployment system knows an occupant location at the instant of deployment. Again, depth image data obtained by, for example, sensor system 200 may be used to perform steps of this method. Therefore, the system gets into the head-tracking mode, and processes each image only around the head. This task takes place in the frame-rate layer, and only a selection of pixels on the head is tracked. At this stage, for efficiency purpose, the sensor system 200 (FIG. 2) may be signaled to produce depth information only around the head or other tracked feature of the occupant.

In step 1710, input is received that signals the occurrence of a crash or other airbag deployment event. For example, as will be described, crash sensors in a vehicle may provide the input that indicate an accident has occurred.

In response to the input, fast-processing mode is triggered. Step 1720 follows with rapid tracking of the occupant head. Other embodiments may provide for tracking of other occupant features, in an attempt to determine a position of the occupant just after the crash. Rapid tracking may be performed similar to step 1620, except in the fast processing mode, the frame rate is faster, and the quality of the sensor data and images is less. Specifically, less resolution is provided with the occupant data. The occupant data is used only to gauge the occupant's position in the moments after the accident. The specific position tracked is of the occupant's head, or other tracking feature.

6.5 Summary of Reasoning Software

The reliability of the system is built on two main factors: First, the high level reasoning would build confidence by temporal accumulation. Second, a sophisticated sensor such as described above can provide three major signals: depth image, active illumination image and ambient illumination image. Multiple algorithms can be executed on each of these images, and the aggregate result gives a confident system decision.

7.0 Hardware Overview

Figure 18:
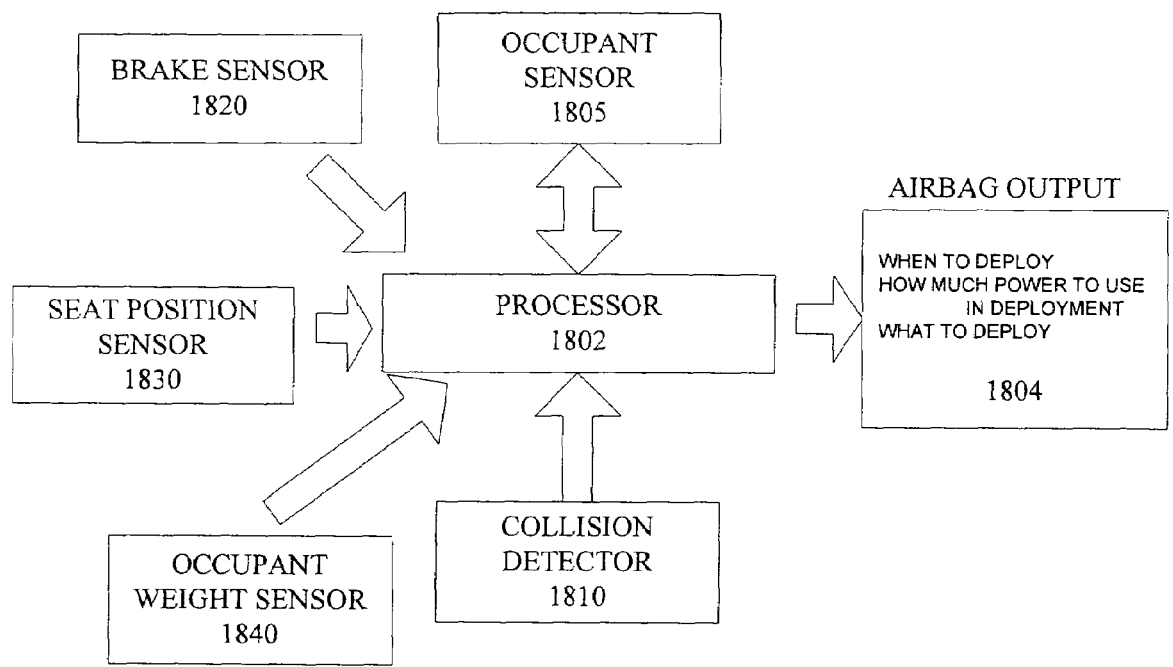
FIG. 18 illustrates a sensor hardware diagram for a vehicle, under an embodiment of the invention.

FIG. 18 illustrates a sensor hardware diagram for a vehicle, under an embodiment of the invention. A computer 1802 includes programming to process input by various sensors within the vehicle. An occupant sensor 1805 is coupled to the computer 1802 determines the occupancy data. The occupant sensor 1805 may operate in a manner described with previous embodiments. A collision sensor 1810 is coupled to the computer 1802 in order to signal the occurrence of a collision. The collision sensor 1810 may detect, for example, compression of the hood or structural movement of the car. Other sensors that may be coupled to computer 1802 include a brake sensor 1820 for determining braking information, a seat position sensor 1830, and an occupant weight sensor 1840. The seat position sensor 1830 may detect when the target passenger seat is moved forward, backward, reclined or otherwise changed in position. The occupant weight sensor 1840 may be located in the seat to make a direct measurement of the occupant's weight, as opposed to determining the occupant information from viewing the occupant.

The computer 1802 may comprise a processor 1812 and memory medium 1814. The memory medium 1814 may store, for example, a library of instructions which can be selectively retrieved and executed by processor 1812. In one embodiment, computer 1802 is programmed to be the decision maker for when and to what extent the airbags are deployed. Reasoning software, such as described herein, may be reside on the occupant sensor 1805 and/or computer 1802. Airbag output 1804 from computer 1802 may control the deployment of the airbag(s) in the vehicle. Decisions on deploying the airbag(s) may be made intelligently based in part on data provided by the occupant sensor 1805. The actual deployment of the airbag may be based on output from more than one sensor. For example, data provided by the brake sensor 1820 may control the level of airbag deployment. If the brake sensors 1820 indicates a maximum stop, the computer 1810 may trigger fast processing of the occupant sensor 1805. If the fast processing 1805 indicates that the user is lurching forward, the airbag may be partially deployed without a collision ever being signaled by the collision sensor 1810.

Occupant sensor 1805 may also receive data from computer 1802. The data received may be from other sensors that communicate with the computer 1802. For example, data from seat sensor 1830 may be passed via computer 1802 to the occupant sensor 1805. Data indicating movement of the seat may cause the occupant sensor 1805 to reclassify the occupant, or search for the occupant's head, on the chance that there was a passenger seat change. As another example, the occupant weight sensor 1840 may provide data that confirms the occupant sensor's determination that the occupant is an adult or child.

While certain aspects of the invention are presented below in certain claim forms, the inventors contemplates the various aspects of the invention in any number of claim forms. Accordingly, the inventors reserve the right to add additional claims after filing the application to pursue such additional claim forms for other aspects of the invention.

What we claim is:

1. A method to determine deployment level of an airbag in a vehicle, the method comprising the following steps:
   (a) disposing in said vehicle a sensor system that emits optical energy toward a scene and includes an array of detection pixels in which each pixel captures three-dimensional depth information of a corresponding location of said scene using a reflected fraction of said emitted optical energy, each said pixel further capturing intensity of said reflected fraction of said emitted optical energy as well as capturing intensity of ambient optical energy, to repeatedly capture a plurality of frames of time-of-flight (TOF) three-dimensional depth images of said scene, said scene including a region of a seat in said vehicle, from which plurality of frames data representing occupancy of said seat may be determined with a confidence level greater than if data from a single frame were used; and
   (b) repeatedly determining occupancy information using confidence enhancing plurality of frames captured at step (a), wherein determined said occupancy information is useable to determine deployment level to intelligently control deployment of said airbag.

2. The method of claim 1, further including:
   (c) upon receipt of an airbag-deployment triggering event, repeating at least portions of step (a) and step (b) more frequently than before occurrence of said airbag-deployment triggering event.

3. The method of claim 1, further including:
   (d) determining airbag deployment level based at least in part on occupancy data captured during at least one of (i) most recently acquired occupancy data captured before occurrence of an airbag-deployment triggering event, and (ii) occupancy data captured immediately after occurrence of an airbag-deployment triggering event;
   wherein such airbag deployment level determination is useable to intelligently control deployment of said airbag.

4. The method of claim 1, further including:
   (c) upon receipt of an airbag-deployment triggering event, repeating at least portions of step (a) and step (b) more frequently than before identification of occurrence of said airbag-deployment triggering event; and
   (d) determining airbag deployment level based at least in part on occupancy data captured after occurrence of an airbag-deployment triggering event;
   wherein such airbag deployment level determination is useable to intelligently control deployment of said airbag.

5. The method of claim 1, wherein step (b) includes at least one procedure selected from a group consisting of (i) using a hierarchical layered determination method, and (ii) using a training algorithm.

6. The method of claim 1, wherein step (b) includes at least one determination selected from a group consisting of (i) determining position information of an occupant of said seat, (ii) determining position information of an occupant of said seat relative to a region from which said airbag is deployable, (iii) determining position information of at least one body portion of an occupant of said seat, (iv) determining position information of at least one body portion of an occupant of said seat relative to a region from which said airbag is deployable, (v) determining a pose of an occupant of said seat; and (vi) determining whether an extremity of said occupant of said seat extends towards a region from which said airbag is deployable.

7. The method of claim 1, further including at least one occupant classification selected from a group consisting of (i) classifying an occupant of said seat, (ii) classifying an occupant of said seat before occurrence of an airbag-deployment triggering event, (iii) classifying an occupant of said seat immediately upon start-up of said vehicle.

8. The method of claim 1, wherein step (b) includes a training algorithm selected from a group consisting of (i) a nearest neighbor classifier, (ii) a support vector machine, (iii) a neural network, and (iv) a linear discriminant analyzer.

9. The method of claim 1, wherein step (a) includes capturing at least one depth image with lower resolution than resolution used before occurrence of an airbag-deployment triggering event.

10. The method of claim 1, further including determining deployment level in a manner selected from a group consisting of (i) lowering deployment level when said occupant is less than a minimum distance from a region from which said airbag is deployable.

11. The method of claim 2, wherein step (c) includes processing input from at least one sensor that signals occurrence of a collision involving said vehicle.

12. The method of claim 1, wherein intelligent deployment of said airbag includes deployment selected from a group consisting of (i) mandatory deployment, (ii) deployment at reduced power, (iii) non-deployment, and (iv) unconditional non-deployment.

13. The method of claim 1, wherein step (a) includes acquiring from at least a region of said scene at least one of (i) depth map information, (ii) reflectivity-based intensity information, and (iii) intensity-based information.

14. The method of claim 1, further including disabling airbag deployment when at least a portion of said occupant is determined to be too close to a region from which said airbag is deployable.

15. A three-dimension time-of-flight (TOF) sensor system to determine deployment level of an airbag in a vehicle, the sensor system deployable within said vehicle and comprising:
- a light source to emit light onto a scene that includes a region of a seat in said vehicle protectable by said airbag;
- a sensor array of detection pixels disposed such that each pixel captures three-dimensional depth information of a corresponding location of said scene using a reflected fraction of emitted light from said light source, each said pixel further capturing intensity of said reflected fraction of emitted light as well as capturing intensity of ambient light, said sensor array;
- means for repeatedly capturing a plurality of frames of time-of-flight (TOF) three-dimensional depth images of said scene from said sensor array, from which plurality of frames data representing occupancy of said seat may be determined with a confidence level greater than if data from a single frame were used; and
- means for repeatedly determining occupancy information using confidence enhancing plurality of frames captured by said sensor array, wherein determined said occupancy information is useable to determine deployment level to intelligently control deployment of said airbag.

16. The sensor system of claim 15, wherein upon receipt of an airbag-deployment triggering event, said means for repeatedly capturing captures more frequently and said means for repeatedly determining determines more frequently than before occurrence of said airbag-deployment triggering event.

17. The sensor system of claim 15, wherein upon occurrence of an airbag-deployment triggering event, airbag deployment level is determined based at least in part on occupancy data captured after occurrence of an airbag-deployment triggering event;
wherein airbag deployment level determination is useable to intelligently control deployment of said airbag.

18. The sensor system of claim 15, wherein upon occurrence of an airbag-deployment triggering event,
said means for repeatedly capturing captures more frequently and said means for repeatedly determining determines more frequently than before occurrence of said airbag-deployment triggering event; and
airbag deployment level is determined based at least in part on occupancy data captured after occurrence of an airbag-deployment triggering event;
wherein airbag deployment level determination is useable to intelligently control deployment of said airbag.

19. The sensor system of claim 15, wherein said means for determining includes at least one procedure selected from a group consisting of (i) a hierarchical layered determination, and (ii) a training algorithm.

20. The sensor system of claim 15, wherein said means for repeatedly determining carries out at least one determination selected from a group consisting of (i) determining position information of an occupant of said seat, (ii) determining position information of an occupant of said seat relative to a region from which said airbag is deployable, (iii) determining position information of at least one body portion of an occupant of said seat, (iv) determining position information of at least one body portion of an occupant of said seat relative to a region from which said airbag is deployable, (v) determining a pose of an occupant of said seat; and (vi) determining whether an extremity of said occupant of said seat extends towards a region from which said airbag is deployable.

21. The sensor system of claim 15, wherein occupant classification includes at least one classification selected from a group consisting of (i) classifying an occupant of said seat, (ii) classifying an occupant of said seat before occurrence of an airbag-deployment triggering event, (iii) classifying an occupant of said seat immediately upon start-up of said vehicle.

22. The sensor system of claim 15, said means for determining includes at least one training algorithm selected from a group consisting of (i) a nearest neighbor classifier, (ii) a support vector machine, (iii) a neural network, and (iv) a linear discriminant analyzer.

23. The sensor system of claim 15, wherein said means for repeatedly capturing captures at least one depth image with lower resolution than resolution used before occurrence of an airbag-deployment triggering event.

24. The sensor system of claim 15, wherein airbag deployment level is determined in a manner selected from a group consisting of (i) lowering deployment level when said occupant is less than a minimum distance from a region from which said airbag is deployable, and (ii) maximizing deployment level when said occupant is a maximum distance from a region from which said airbag is deployable.

25. The sensor system of claim 15, further including at least one sensor that signals occurrence of a collision involving said vehicle, output from said at least one sensor being processed to identify occurrence of an airbag- deployment triggering event.

26. The sensor system of claim 15, wherein said means for determining intelligent deployment of said airbag includes deployment selected from a group consisting of (i) mandatory deployment, (ii) deployment at reduced power, (iii) non-deployment, and (iv) unconditional non-deployment.

27. The sensor system of claim 15, wherein said means for repeatedly capturing acquires from at least a region of said scene at least one of (i) depth map information, (ii) reflectivity-based intensity information, and (iii) intensity-based information.

28. The sensor system of claim 15, further including disabling airbag deployment when at least a portion of said occupant is determined to be too close to a region from which said airbag is deployable.

29. The sensor system of claim 15, wherein said-means for determining includes a training algorithm selected from a group consisting of (i) a nearest neighbor classifier, (ii) a support vector machine, (iii) a neural network, and (iv) a linear discriminant analyzer.

30. The sensor system of claim 15, wherein said system determines whether an image contains a face of a passenger in said seat.

31. The sensor system of claim 15, wherein at least a portion of said system operates under control of a processor.

* * * * *